(12) United States Patent
Park et al.

(10) Patent No.: US 10,798,714 B2
(45) Date of Patent: Oct. 6, 2020

(54) APPARATUS AND METHOD FOR ALLOCATING RESOURCES IN WIRELESS COMMUNICATION SYSTEM

(71) Applicant: Samsung Electronics Co., Ltd., Suwon-si, Gyeonggi-do (KR)

(72) Inventors: Hyoyol Park, Suwon-si (KR); Balgeum Choe, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 36 days.

(21) Appl. No.: 16/242,506

(22) Filed: Jan. 8, 2019

(65) Prior Publication Data

US 2019/0215840 A1 Jul. 11, 2019

(30) Foreign Application Priority Data

Jan. 8, 2018 (KR) .................. 10-2018-0002414

(51) Int. Cl.
*H04B 7/00* (2006.01)
*H04W 72/04* (2009.01)
(Continued)

(52) U.S. Cl.
CPC ...... *H04W 72/0493* (2013.01); *H04B 7/0617* (2013.01); *H04B 7/0626* (2013.01);
(Continued)

(58) Field of Classification Search
CPC ......... H04W 28/0231; H04W 28/0247; H04W 28/0252; H04W 28/0278
(Continued)

(56) References Cited

U.S. PATENT DOCUMENTS 8,792,440 B2 * 7/2014 Feuersanger ..... H04W 28/0278
370/329
8,855,068 B2 * 10/2014 Qin ....................... H04L 5/0032
370/329
(Continued)

FOREIGN PATENT DOCUMENTS

EP 3 016 466 A1 5/2016
KR 10-2010-0085713 A 7/2010
(Continued)

OTHER PUBLICATIONS

International Search Report dated Apr. 12, 2019, issued in International Application No. PCT/KR2019/000281.
(Continued)

*Primary Examiner* — Dmitry Levitan
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as long term evolution (LTE). According to various embodiments of the disclosure, a base station in a wireless communication system may include at least one transceiver and at least one processor operably coupled with the at least one transceiver, wherein the at least one processor may be configured to receive channel information regarding a plurality of carriers which are set in a terminal, from the terminal, distribute buffer occupancy (BO) of the terminal to the plurality of carriers by sequentially determining buffer usage for each of the plurality of carriers of the terminal based on the channel information, and allocate resources based on the buffer usage.

18 Claims, 13 Drawing Sheets

(51) Int. Cl.
    *H04W 80/02*     (2009.01)
    *H04L 1/00*     (2006.01)
    *H04B 7/06*     (2006.01)
    *H04B 7/0452*     (2017.01)

(52) U.S. Cl.
    CPC ......... *H04B 7/0632* (2013.01); *H04L 1/0003* (2013.01); *H04W 72/0453* (2013.01); *H04W 72/0486* (2013.01); *H04W 80/02* (2013.01); *H04B 7/0452* (2013.01); *H04B 7/0695* (2013.01)

(58) Field of Classification Search
    USPC .................................................. 370/310, 328
    See application file for complete search history.

(56) References Cited

U.S. PATENT DOCUMENTS

| | | | |
|---|---|---|---|
| 8,934,360 B2* | 1/2015 | Dai ................... | H04W 72/1284 370/252 |
| 9,668,171 B2* | 5/2017 | Gupta ................... | H04W 28/08 |
| 9,788,233 B2* | 10/2017 | Rastogi ............. | H04W 72/1247 |
| 10,271,347 B2* | 4/2019 | Loehr ............... | H04W 52/0206 |
| 2006/0069553 A1 | 5/2006 | Hakansson et al. | |
| 2010/0182951 A1 | 7/2010 | Park et al. | |
| 2013/0223384 A1 | 8/2013 | Speight | |
| 2014/0078965 A1* | 3/2014 | Wu ........................ | H04L 67/06 370/328 |
| 2016/0143046 A1 | 5/2016 | Gupta et al. | |
| 2018/0317240 A1 | 11/2018 | Jang et al. | |
| 2018/0332604 A1* | 11/2018 | Lee ...................... | H04W 52/365 |
| 2019/0021130 A1* | 1/2019 | Kim ................... | H04W 72/042 |

FOREIGN PATENT DOCUMENTS

| | | |
|---|---|---|
| KR | 10-2017-0058635 A | 5/2017 |
| WO | 2017/111470 A1 | 6/2017 |

OTHER PUBLICATIONS

International Written Opinion dated Apr. 12, 2019, issued in International Application No. PCT/KR2019/000281.

* cited by examiner

APPARATUS AND METHOD FOR ALLOCATING RESOURCES IN WIRELESS COMMUNICATION SYSTEM

CROSS-REFERENCE TO RELATED APPLICATION(S)

This application is based on and claims priority under 35 U.S.C. § 119(a) of a Korean patent application No. 10-2018-0002414, filed on Jan. 8, 2018, in the Korean Intellectual Property Office, the disclosure of which is incorporated by reference herein in its entirety.

BACKGROUND

1. Field

The disclosure relates generally to a wireless communication system. More particularly, the disclosure relates to an apparatus and a method for allocating resources in the wireless communication system.

2. Description of the Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To satisfy a high data rate according to user's demands, the wireless communication system requires support of carrier aggregation (CA) which utilizes component carriers (CCs) in a bundle. To process data in buffer occupancy of a terminal, resources may be allocated based on the CC. In so doing, if buffer usage allocated to each CC is not accurately reflected, the resources may not be allocated efficiently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure to provide an apparatus and a method for sequentially distributing buffer occupancy per component carrier (CC) for carrier aggregation (CA), to efficiently allocate resources in a wireless communication system.

Another aspect of the disclosure is to provide an apparatus and a method for changing a location of a CC which initiates buffer occupancy distribution, in every scheduling, to adapt to change of a radio channel state.

Additional aspects will be set forth in part in the description which follows and, in part, will be apparent from the description, or may be learned by practice of the presented embodiments.

In accordance with an aspect of the disclosure, a base station in a wireless communication system is provided. The base station includes at least one transceiver and at least one processor operably coupled with the at least one transceiver, wherein the at least one processor may be configured to receive channel information regarding a plurality of carriers which are set in a terminal, from the terminal, distribute buffer occupancy (BO) of the terminal to the carriers by sequentially determining buffer usage for each of the carriers of the terminal based on the channel information, and allocate resources based on the buffer usage.

In accordance with another aspect of the disclosure, a method for operating a base station in a wireless communication system is provided. The method includes receiving, by the base station, channel information regarding a plurality of carriers which are set in a terminal, from the terminal, distributing, by the base station, BO of the terminal to the carriers by sequentially determining buffer usage for each of the carriers of the terminal based on the channel information, and allocating, by the base station, resources based on the buffer usage.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
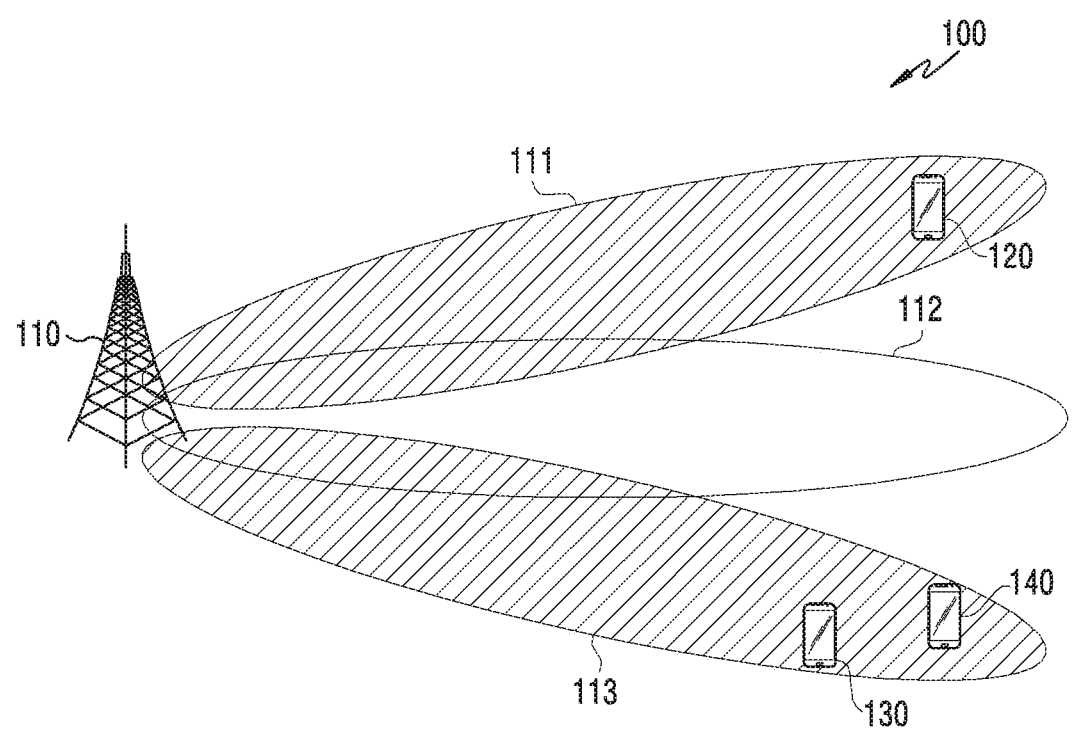
FIG. 1 illustrates a wireless communication system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are used for describing particular embodiments and are not intended to limit the scope of other embodiments. A singular form may include a plurality of forms unless it is explicitly differently represented. All the terms used herein, including technical and scientific terms, may have the same meanings as terms that are generally understood by those skilled in the art to which the disclosure pertains. Among terms used in the disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure, the terms should not be interpreted to exclude the embodiments of the disclosure.

In various embodiments of the disclosure to be described below, a hardware approach will be described as an example. However, since the various embodiments of the disclosure include a technology using both hardware and software, the various embodiments of the disclosure do not exclude a software-based approach.

Various embodiments of the disclosure provide an apparatus and a method for increasing a total data rate for a unit scheduling time, by sequentially distributing buffer occupancy (BO) of a terminal per component carrier (hereafter, referred to as a carrier), in resource allocation of carrier aggregation (CA) in a wireless communication system. Specifically, the disclosure explains a technique for determining buffer usage of each carrier more accurately, for the BO distribution in the wireless communication system.

Terms indicating resource variables (e.g., resource block (RB), transport block (TB), frequency, subcarrier, carrier, component carrier, bandwidth, time, symbol, subframe, radio frame, layer, beam), terms relating to scheduling (e.g., transmission time interval (TTI), unit scheduling time, scheduling interval, resource allocation, channel capacity, modulation order, code rate, modulation and coding scheme (MCS)), terms indicating network entities, and terms indicating components (e.g., a scheduling unit, a central scheduler, a carrier scheduler) of a device, which are used in the following descriptions, are for the sake of explanations. Accordingly, the disclosure is not limited to the terms to be described, and may use other terms having technically identical meaning.

The disclosure provides various embodiments using terms used in some communication standards (e.g., 3rd Generation Partnership Project (3GPP)) by way of example. Various embodiments of the disclosure may be easily used in other communication systems.

FIG. 1 illustrates a wireless communication system according to various embodiments of the disclosure. FIG. 1 depicts a wireless communication system 100 including a base station 110, a terminal 120, a terminal 130, and a terminal 140, as some of nodes which use a radio channel in the wireless communication system 100.

Referring to FIG. 1, the base station 110 is a network infrastructure which provides radio access to the terminals 120, 130, and 140. The base station 110 has coverage defined as a geographical area, based on a signal transmission distance. The base station 110 may be referred to as an access point (AP), an eNodeB (eNB), a 5th generation node (5G node), a wireless point, or other term having a technically equivalent meaning According to various embodiments, the base station 110 may be connected with one or more transmission/reception points (TRPs). Via the one or more TRPs, the base station 110 may transmit a downlink signal to or receive an uplink signal from the terminal 120, the terminal 130, or the terminal 140.

The terminal 120, the terminal 130, and the terminal 140 each are used by a user, and communicate with the base station 110 over the radio channel. In some cases, at least one of the terminal 120, the terminal 130, or the terminal 140 may be operated without user's involvement. That is, at least one of the terminal 120, the terminal 130, and the terminal 140 performs machine type communication (MTC) and may not be carried by the user. The terminal 120, the terminal 130, and the terminal 140 each may be referred to as a user equipment (UE), a mobile station, a subscriber station, a customer premises equipment (CPE), a remote terminal, a wireless terminal, an electronic device, a user device, or other term having a technically equivalent or similar meaning.

The base station 110, the terminal 120, the terminal 130, and the terminal 140 may transmit and receive radio signals in a millimeter wave (mmWave) band (e.g., 28 GHz, 30 GHz, 38 GHz, 60 GHz). Since a communication system using the mmWave is subject to high path loss, the base station 110, the terminal 120, the terminal 130, and the terminal 140 may conduct beamforming using a plurality of analog beams, to overcome such a shortcoming and to improve channel gain. Herein, the beamforming may include transmit beamforming and receive beamforming That is, the base station 110, the terminal 120, the terminal 130, and the terminal 140 may apply directivity to a transmit signal or a receive signal. For doing so, the base station 110 and the terminals 120, 130, and 140 may select serving beams through beam search or beam management. After the serving beams are selected, communications may be performed using resources which are quasi co-located (QCL) with resources carrying the serving beams. For example, the base station 110 may identify the serving beam from beams 111, 112, and 113 through the beam search or the beam management. The base station 110 may communicate with the terminal 120 using the serving beam 111. The base station 110 may communicate with the terminal 130 and the terminal 140 using the serving beam 113.

The base station 110 may allocate resources to transmit data to the terminal or to receive data from the terminal. Herein, the resources may be time-frequency resources. The base station 110 may allocate resources to at least one terminal within a unit scheduling time. The base station 110 may allocate resources to at least one terminal which is served by the beam for the unit scheduling time. The base station 110 may perform the beam-based scheduling by dividing the resources based on time.

The base station 110 may support a communication technique according to a single user (SU)-multiple input multiple output (MIMO). For example, the base station 110 may allocate resources to a terminal which is served with one beam. The base station 110 may perform scheduling for one terminal, during the unit scheduling time. The base station 110 may perform scheduling per carrier for one terminal. For example, the base station 110 may allocate resources to terminals which are served by one beam. The base station 110 may perform the scheduling for the terminals, during the unit scheduling time. The base station 110 may perform the scheduling per carrier for the terminals.

The base station 110 may support a communication technique according to multi user (MU)-MIMO. The base station 110 may allocate resources to terminals which are served by a plurality of beams. The plurality of the beams may be divided spatially. The base station 110 may perform the scheduling for the terminals per common carrier, within the unit scheduling time. The base station 110 may transmit data to each terminal by changing the beam in the same TTI. According to an embodiment, the base station 110 may transmit downlink signals including data to the terminals for the MU-MIMO by applying different scrambling sequences or different orthogonal codes.

The base station 110 includes a scheduler for the resource allocation, that is, for the scheduling. The base station 110 may perform the scheduling to transmit data to the terminal, that is, for the downlink transmission. In addition, the base station 110 may perform the scheduling to receive data from the terminal, that is, for the uplink transmission. The base station 110 may perform the scheduling, wherein the terminal transmits data to another terminal. Hereafter, the scheduling is described based on the downlink in the disclosure for the sake of explanations.

BO of the terminal for the scheduling exists. The BO indicates an amount of data currently queued at a buffer for the data transmission. The base station 110 allocates the resources, to process data corresponding to the BO of each terminal. The base station 110 processes data corresponding to at least part of the BO, through the scheduling per unit scheduling time. In the CA environment, the base station 110 may distribute and process data corresponding to at least part of the BO per unit scheduling time, based on the carrier. In this disclosure, if the base station distributes the BO of the terminal to the carriers, the BO distributed to the carrier is referred to as buffer usage for the carrier.

If the buffer usage for a carrier (e.g., a primary CC (PCC)) of a specific cell (e.g., a primary cell (Pcell)) is uniformly determined to buffer usage of a carrier (e.g., a secondary CC (SCC)) of another cell (e.g., a secondary cell (Scell)), the resources may be wasted because the data amount actually transmitted by the carrier of other cell is not reflected. For example, the buffer usage for the Scell is distributed excessively to a specified terminal, and padding is inserted besides the data amount practically transmitted. In this case, the base station may not allocate resources to other terminal due to the buffer usage distributed to the specified terminal. Further, if accurate physical channel information is not acquired per carrier, the buffer usage for the specific carrier is smaller than the data amount actually transmitted and the buffer usage for the other carrier is greater than the data amount actually transmitted, thus not achieving efficient resource allocation.

To address such drawbacks, the base station according to various embodiments of the disclosure may determine the buffer usage per carrier by sequentially distributing the BO of each terminal per carrier. Now, scheduling procedures and functional configurations of the base station and the terminal for determining the buffer usage for each carrier are described with FIGS. 2A through 4C.

Figure 2A:
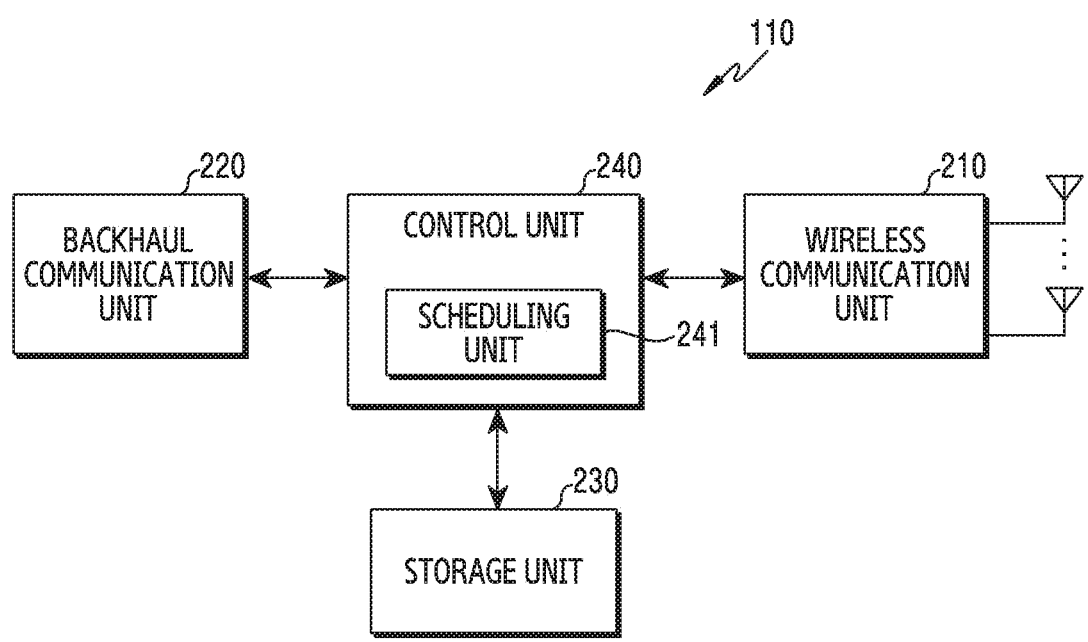
FIG. 2A illustrates an example of a base station configuration in a wireless communication system according to various embodiments of the disclosure.

FIG. 2A illustrates an example of a base station configuration in a wireless communication system according to various embodiments of the disclosure. FIG. 2A depicts a configuration of the base station 110. A term such as 'portion' or '~er' indicates a unit for processing at least one function or operation, and may be implemented using hardware, software, or a combination of hardware and software.

Referring to FIG. 2A, the base station 110 includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. According to various embodiments, a modulation scheme and a coding scheme for generating the symbols or restoring the bit string may be determined by a scheduling result of the control unit 240.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements. In view of hardware, the wireless communication unit 210 may include a digital unit and an analog unit, and the analog unit may include a plurality of sub-units according to an operating power and an operating frequency. According to various embodiments, the wireless communication unit 210 may transmit a signal based on a power value which is set by the control unit 240. According to various embodiments, the wireless communication unit 210 may receive from the terminal, feedback information (e.g., channel state information (CSI)), hybrid automatic repeat request (HARQ) feedback information) for the carriers. Herein, the carriers may be configured for the CA.

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string. In some embodiments, to support the CA between base stations, the backhaul communication unit 220 may provide buffer usage information of a corresponding carrier to other node.

The storage unit 230 stores a basic program for operating the base station 110, an application program, and data such as setting information. The storage unit 230 may include a volatile memory, a non-volatile memory, or a combination of a volatile memory and a non-volatile memory. The storage unit 230 provides the stored data in response to a request of the control unit 240. According to various embodiments, the base station 110 may include beam related information (e.g., terminal information per beam, carrier information per beam, channel information per beam). The base station 110 may include terminal related information (e.g., carrier information per terminal, channel information per terminal, BO information per terminal). The base station 110 may include carrier related information (e.g., channel information per carrier). Herein, the channel information may be stored as CSI (e.g., channel quality indicator (CQI), rank indicator (RI)) reported from the terminal, or may be stored by converting to channel quality (e.g., signal to interference and noise ratio (SINR)) for determining an MCS level or a channel capacity. According to various embodiments, the storage unit 230 may store information of the MCS level or the channel capacity.

The control unit 240 controls general operations of the base station 110. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. For doing so, the control unit 240 may include at least one processor. According to various embodiments, the control unit 240 may include a scheduling unit 241 which determines the buffer usage per carrier, sequentially distribute the BO of the terminal, and allocates resources per carrier according to the distribution result. Herein, the scheduling unit 241 may be, as an instruction set or code stored in the storage unit 230, the instructions/code resided in the control unit 240 at least temporarily or a storage space storing the instructions/code, or part of circuitry of the control unit 240.

According to various embodiments, the control unit 240 may control the base station 110 to carry out operations to be explained according to various embodiments.

The configuration of the control unit 240 of FIG. 2A is merely the example of the control unit 240, and some of the configuration may be added, removed, or modified according to various embodiments.

Figure 2B:
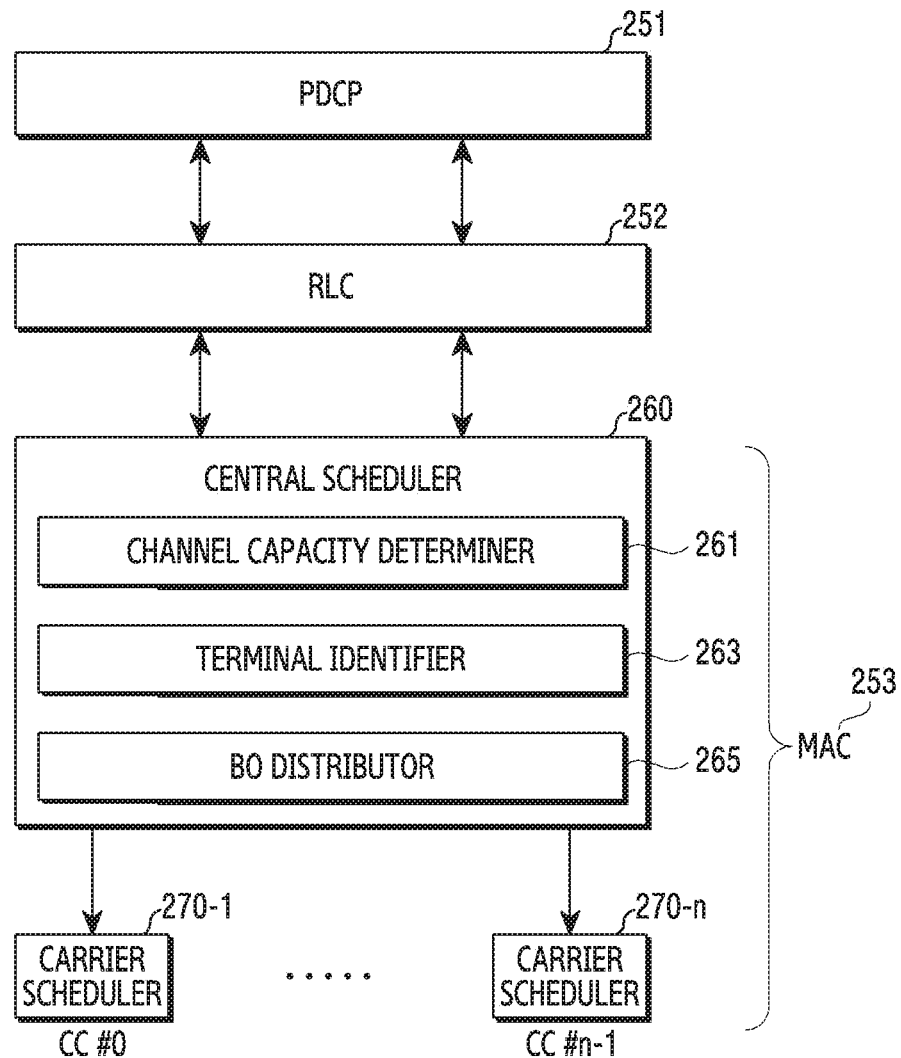
FIG. 2B illustrates an example of a scheduling unit configuration in a wireless communication system according to various embodiments of the disclosure.

FIG. 2B illustrates an example of a scheduling unit configuration in a wireless communication system according to various embodiments of the disclosure. Herein, the scheduling unit may be understood as the configuration of the scheduling unit 241 of FIG. 2A. For more accurate understanding of the scheduling procedure, a protocol configuration per layer of the base station for the scheduling is described with the configuration of the scheduling unit.

Referring to FIG. 2B, a packet data convergence protocol (PDCP) layer 251 may provide user data transmission, header compression and decompression, ciphering or deciphering, or integrity protection. For the scheduling, the base station forwards to a radio link control (RLC) layer 252, a PDCP packet data unit (PDU) by adding a PDCP header to a PDCP service data unit (SDU) corresponding to data.

The RLC layer 252 may perform concatenation, segmentation, resegmentation, sequence numbering, or reassembly of the RLC SDU. One RLC entity may exist per radio bearer. The RLC entity may include an RLC buffer. The RLC buffer may queue data for the terminal. Herein, an amount of the queued data indicates the BO. Hereafter, the buffer occupancy of the radio bearer of the terminal is referred to as the buffer occupancy of the terminal for the sake of explanations. For the scheduling, the base station provides the buffer occupancy of each terminal to a media access control (MAC) layer 253.

The MAC layer 253 may perform mapping of a logical channel and a transport channel, error correction using HARQ, priority handling, or multiplexing/demultiplexing to a TB provided as a physical channel on the transport channel of the MAC SDU which belongs to the logical channel. The service is provided from the RLC layer 252 to the MAC layer 253 over the logical channel. The logical channel may include a control channel for delivering control region information and a traffic channel for delivering user region information.

The base station provides the BO of each terminal to the MAC layer 253. The base station may control the resource allocation, at the MAC layer 253. That is, the scheduler of the base station may control, as part of the MAC layer 253, uplink and downlink resource allocation. Hereafter, a scheduler structure where the central scheduling and the carrier schedulers are operably coupled is illustrated. To precisely distribute the BO per carrier, the central scheduler may predict the data amount to be processed by each carrier and distribute the BO using prediction results, using physical channel information (e.g., beam information, channel information per beam, available resource information) used in the scheduling. Each carrier scheduler may allocate resources corresponding to the BO distributed to each carrier. Each carrier scheduler may schedule the carriers in parallel within the unit scheduling time. As the parallel scheduling is performed per carrier, the total scheduling time may reduce, compared with serial scheduling per carrier.

The scheduler may include a central scheduler 260 and carrier schedulers 270-1 through 270-*n*, to process a plurality of carriers for the CA. It is assumed that n-ary carriers (e.g., CC #0 through CC#n−1) are set for the CA in terminals. The central scheduler may be referred to as a main scheduler.

The central scheduler 260 may include a channel capacity determiner 261, a terminal identifier 263, and a BO distributor 265. The channel capacity determiner 261 may calculate channel quality based on channel information (e.g., CQI, HARQ feedback) received from the terminal. The channel information may be channel information per carrier, channel information of the carriers, or channel information of the total carriers. The channel quality may be channel quality per carrier. For example, the channel quality may be channel quality per carrier per beam. The channel capacity determiner 261 may determine the channel capacity. The channel capacity determiner 261 may determine the channel capacity based on the calculated channel quality. The channel capacity may indicate an information quantity for carrying data using a unit resource (e.g., tone). Herein, the tone may indicate a resource corresponding to one subcarrier.

The terminal identifier 263 may identify a terminal for the scheduling (hereafter, a scheduling terminal). According to various embodiments, before identifying the scheduling terminal, the terminal identifier 263 may identify a beam for the scheduling (hereafter, a scheduling beam). Since the same physical antenna is shared, each carrier scheduler may perform the scheduling with the same beam during the unit scheduling time. Hence, the terminal identifier 263 may identify the scheduling beam per carrier. The terminal identifier 263 may determine terminals served by the scheduling beam, as the scheduling terminals. The terminal identifier 263 may identify the scheduling terminal for BO distribution among the determined scheduling terminals. For example, the terminal identifier 263 may sequentially identify the scheduling terminal according to a bearer priority of the scheduling terminals.

The BO distributor 265 may determine the buffer usage per carrier of the terminal, and distribute the BO of the terminal to the carriers. The BO distributor 265 may determine the buffer usage per carrier, by considering the resource allocation of the actual physical channel. The BO distributor 265 may sequentially determine the buffer usage for the carriers of the terminal, and distribute the BO of the terminal to the corresponding carrier. As the BO of the terminal is distributed to the carriers, frequency resources may be efficiently allocated to the terminals.

The central scheduler 260 may provide the distributed buffer usage of the carriers, to the carrier schedulers 270-1 through 270-n.

The carrier schedulers 270-1 through 270-n each may allocate resources corresponding to the buffer usage distributed from the central scheduler 260, that is, resources corresponding to the buffer usage of the carriers. Each carrier scheduler may determine the MCS level of a corresponding terminal, according to the buffer usage for the carrier of the terminal, and determine the number of RBs to allocate. Each carrier scheduler schedules each terminal on the carrier basis. That is, the carrier schedulers 270-1 through 270-n each may independently perform the scheduling. Since scheduling times of the carrier schedulers 270-1 through 270-n may overlap, total scheduling time for the carriers may reduce.

The configuration of the central scheduler 260 and the carrier schedulers 270-1 through 270-n of FIG. 2B are merely the example, and some of the configuration may be added, removed, or modified. In some embodiments, the base station 110 may include all of the carrier schedulers 270-1 through 270-n. For example, if the CA in the base station 110 (e.g., infra-eNB CA) is supported, the base station 110 may include a carrier scheduler for the Pcell and carrier schedulers for the S cell. In some embodiments, the base station 110 may include some of the carrier schedulers 270-1 through 270-n. For example, if the CA between the base station 110 and another base station (e.g., inter-eNB CA) is supported, the base station 110 may include a carrier scheduler for the Pcell and the other base station may include a carrier scheduler for the Scell.

According to various embodiments, each carrier scheduler which performs the carrier-based BO distribution may allocate the resources according the different buffer usage. That is, the buffer usage transmitted to the carrier schedulers may not be the same. The base station may not allocate the same BO of the terminal to the Pcell and the Scell. The resource amount allocated by each carrier scheduler may differ per serving cell.

In FIG. 2B, each carrier scheduler allocates the resource corresponding to the buffer usage for, but not limited to, each carrier. According to an embodiment, a specific carrier scheduler may perform the resource allocation for another carrier, that is, cross-carrier scheduling. The central scheduler may forward the buffer usage of the carriers to the carrier schedulers which perform the cross-carrier scheduling.

As the central scheduler and the carrier schedulers are independently configured for the sake of the high data rate as shown in FIG. 2B, the scheduling time is reduced, which is effective in the communication system for the high data rate.

Figure 3:
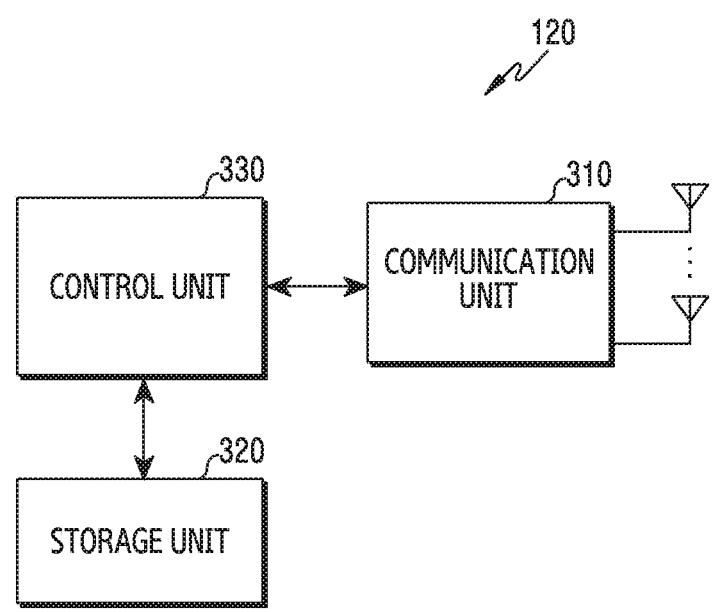
FIG. 3 illustrates an example of a terminal configuration in a wireless communication system according to various embodiments of the disclosure.

FIG. 3 illustrates an example of a terminal configuration in a wireless communication system according to various embodiments of the disclosure. FIG. 3 depicts a configuration of the terminal 120. A term such as 'portion' or '~er' indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like. Also, the communication unit 310 may include a plurality of transmit and receive paths. Further, the communication unit 310 may include at least one antenna array including a plurality of antenna elements. In view of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains.

The communication unit 310 may include a filter for extracting a frequency band signal from a specific signal. According to various embodiments, the communication unit 310 may support the CA. According to an embodiment, the communication unit 310 may include a filter for each of frequency bands, for the inter-band CA. According to another embodiment, the communication unit 310 may include a filter for the intra-band CA. The communication unit 310 may feed channel information per carrier back to the base station.

Further, the communication unit 310 may include a plurality of communication modules for supporting different radio access technologies. For example, different radio access technologies may include Bluetooth low energy (BLE), wireless fidelity (Wi-Fi), WiFi Gigabyte (WiGig), and a cellular network (e.g., Long Term Evolution (LTE), new radio (NR)). Different frequency bands may include a super high frequency (SHF) (e.g., 2.5 GHz, 5 GHz) band and a millimeter weave (e.g., 38 GHz, 60 GHz) band.

As such, the communication unit 310 transmits and receives the signals. Hence, whole or part of the communication unit 310 may be referred to as a transmitter, a receiver, or a transceiver. Hereafter, the transmission and the reception over the radio channel include the above-stated processing of the communication unit 310.

The storage unit 320 stores a basic program for operating the terminal 120, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal 120. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. Part of the communication unit 310 and the control unit 330 may be referred to as a communication processor (CP). The control unit 330 may include various modules for the communication. According to various embodiments, the control unit 330 may control the terminal to carry out operations to be explained, according to various embodiments.

Figure 4A:
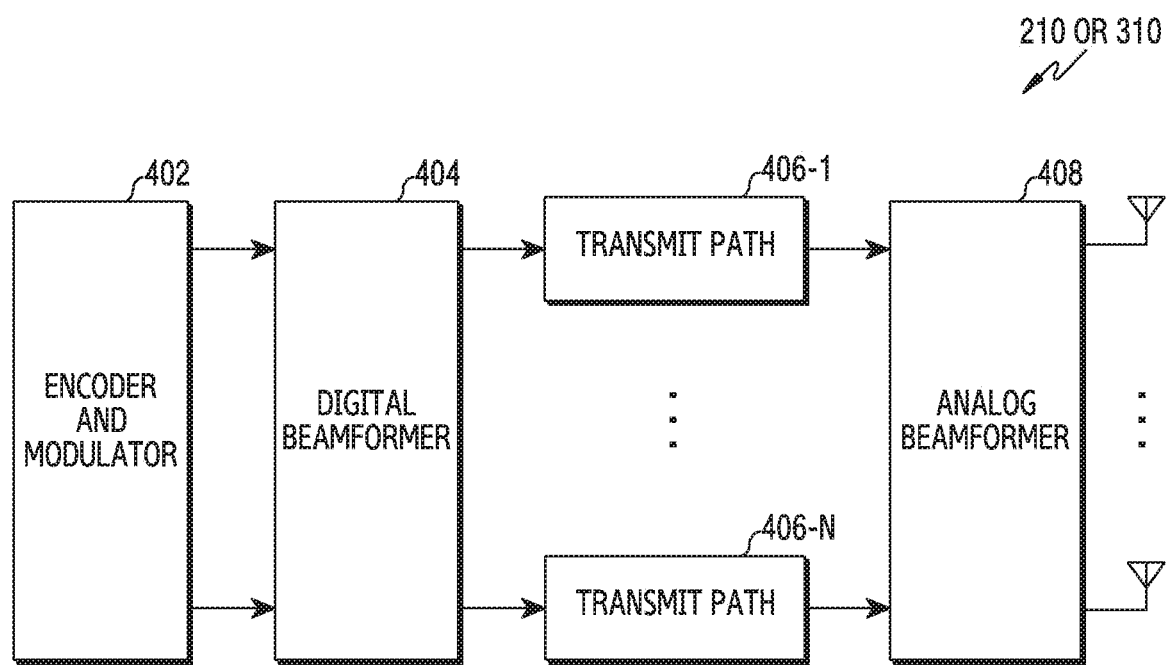
FIGS. 4A, 4B, and 4C illustrate a configuration of a communication unit in a wireless communication system according to various embodiments of the disclosure.
Figure 4B:
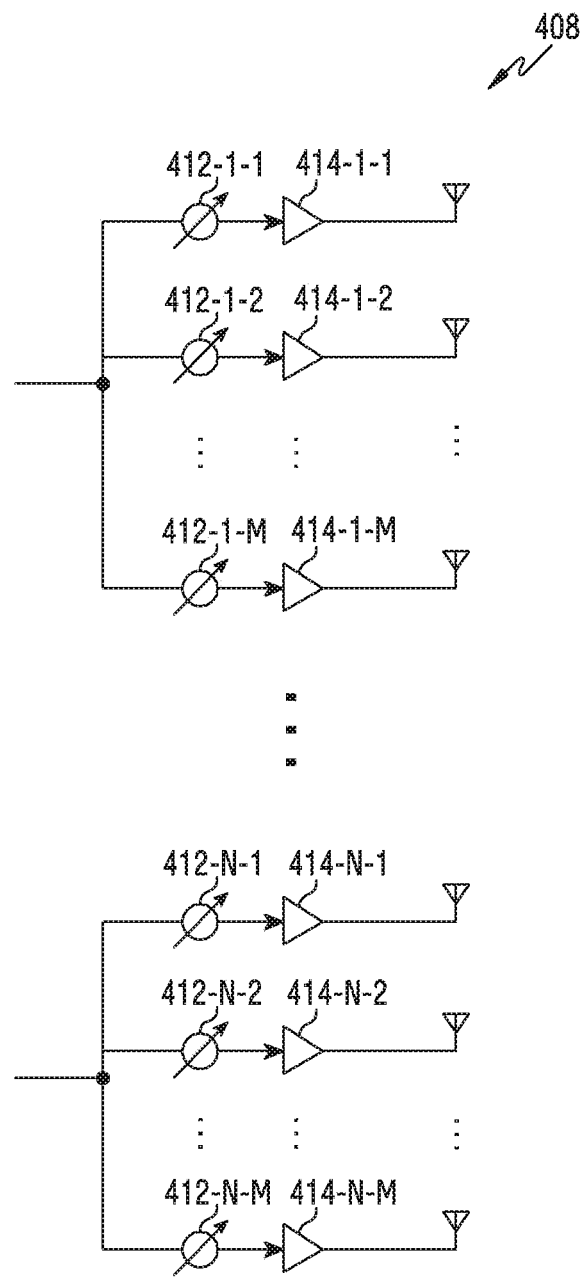
Figure 4C:
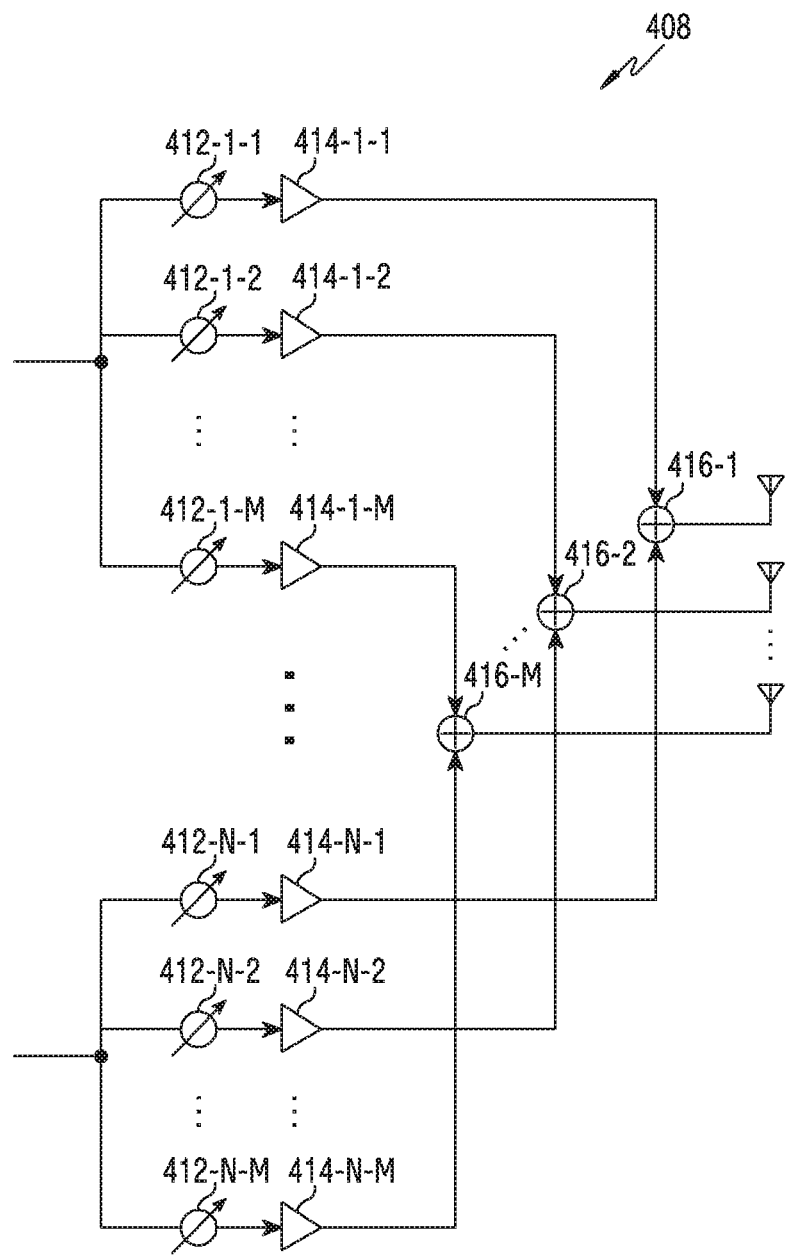

FIGS. 4A, 4B, and 4C illustrate a communication unit in a wireless communication system according to various embodiments of the disclosure. FIGS. 4A, 4B, and 4C depict a detailed configuration of the wireless communication unit 210 of FIG. 2A or the communication unit 310 of FIG. 3. More specifically, FIGS. 4A, 4B, and 4C depict components for performing the beamforming, as part of the wireless communication unit 210 of FIG. 2A or the communication unit 310 of FIG. 3.

Referring to FIG. 4A, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change an amplitude and a phase of the signal, and may be referred to as a precoding matrix or a precoder. The digital beamformer 404 outputs the digital-beamformed modulation symbols to the transmit paths 406-1 through 406-N. In so doing, according to MIMO transmission, the modulation symbols may be multiplexed or the same modulation symbols may be fed to the transmit paths 406-1 through 406-N.

The transmit paths 406-1 through 406-N convert the digital-beamformed digital signals to analog signals. For doing, the transmit paths 406-1 through 406-N each may include an inverse fast fourier transform (IFFT) operator, a CP adder, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming Notably, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals inputted to the analog beamformer 408 are converted in phase/amplitude, amplified, and then transmitted via the antennas. In so doing, signals of each path are transmitted via different antenna sets, that is, antenna arrays. Signals inputted in a first path are converted by phase/amplitude converters 412-1-1 through 412-1-M to signal strings having different or the same phase/amplitude, amplified by amplifiers 414-1-1 through 414-1-M, and then transmitted via the antennas. Similarly, signals inputted in an Nth path are converted by phase/amplitude converters 412-N-1 through 412-N-M to signal strings having different or the same phase/amplitude, amplified by amplifiers 414-N-1 through 414-N-M, and then transmitted via the antennas.

Referring to FIG. 4C, signals inputted to the analog beamformer 408 are converted in phase/amplitude, amplified, and then transmitted via antennas. In so doing, signals of each path are transmitted via the same antenna set, that is, the same antenna array. Signals inputted in the first path are converted by the phase/magnitude converters 412-1-1 through 412-1-M to signal strings having different or the same phase/amplitude, and amplified by the amplifiers 414-1-1 through 414-1-M. Next, to transmit via a single antenna array, the amplified signals are summed by adders 416-1 through 416-M based on the antenna element and then transmitted via the antennas.

The independent antenna array is used per transmit path in FIG. 4B, and the transmit paths share the single antenna array in FIG. 4C. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

Data to be transmitted to the terminal or data transmitted from the terminal requires allocation of physical resource, to transmit over the radio channel. The data rate reduces if less resource than required is allocated, and unnecessary resource is wasted if too much resource is allocated. Accordingly, the scheduler which performs the resource allocation is required to more accurately predict resources to be allocated to the data, for the sake of optimal resource utilization efficiency.

To calculate the transmit data amount, the scheduler may refer to the BO. For the terminal which supports the CA, the base station may perform downlink transmission by distributing the data to each carrier. To allocate resources corresponding to the data amount delivered by each carrier, the base station needs to determine the accurate buffer usage for each carrier in the buffer occupancy.

Now, the following describes a method (hereafter, carrier-based BO distribution) for more accurately distributing the buffer occupancy of each terminal served by the base station, to the carriers, by adapting to a radio channel state change, in FIG. 5 through FIG. 8.

Carrier-Based BO Distribution

Figure 5:
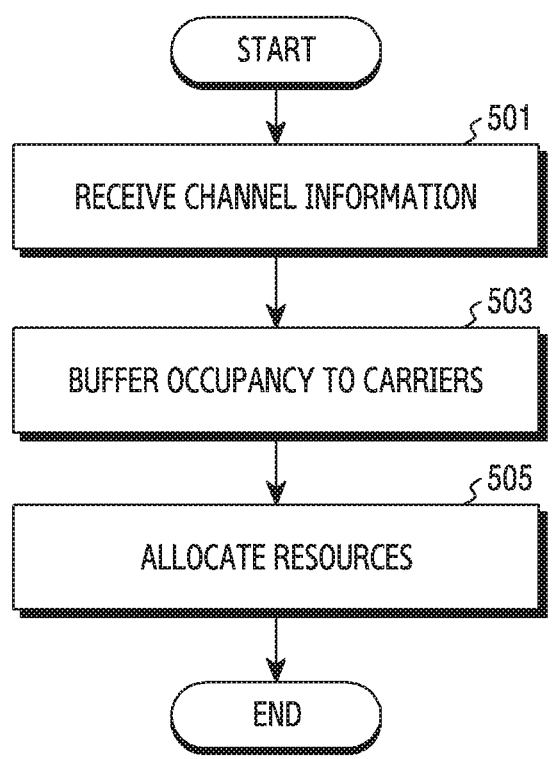
FIG. 5 illustrates a flowchart of a base station for allocating resources through carrier-based buffer occupancy (BO) distribution according to various embodiments of the disclosure.

FIG. 5 illustrates a flowchart of a base station for allocating resources through carrier-based BO distribution according to various embodiments of the disclosure. The base station may be the base station 110 of FIG. 1.

Referring to FIG. 5, in operation 501, the base station may receive channel information. The base station may receive the channel information regarding a plurality of carriers. The base station may receive the channel information regarding a plurality of carriers from a terminal. The carriers may be set for CA of the terminal. According to an embodiment, the base station may receive the channel information regarding each of carriers. According to an embodiment, the base station may receive the channel information regarding at least one of carriers.

According to various embodiments, the channel information may include CSI. The CSI may include at least one of CQI, precoding matrix indicator (PMI), RI, and channel resource indicator (CRI). According to an embodiment, the CQI may be used to determine channel quality. According to an embodiment, the RI may be used to determine the number of layers to be used for data transmission. According to an embodiment, the PMI or the CRI may be used to identify a scheduling beam or a scheduling terminal.

According to various embodiments, the channel information may include HARQ information. The HARQ information may include acknowledge (ACK)/negative ACK (NACK) regarding data previously transmitted. The HARQ information may be used to determine the channel quality enhanced for link adaptation based on the channel change.

In operation 503, the base station may distribute buffer occupancy to each carrier. The base station may distribute the buffer occupancy to each carrier based on the channel information. The base station may distribute the buffer occupancy of the terminal to each carrier, by sequentially determining the buffer usage for the carrier based on the channel information. That is, the base station may perform the carrier-based BO distribution for the terminal.

The base station may determine the channel quality of the carrier based on the channel information. The base station may calculate the channel quality (e.g., SINR per beam) of each terminal based on the received channel information (e.g., CSI or HARQ feedback information). According to various embodiments, relationship between the channel quality and the channel information may be adaptively determined by reception performance of the terminal. Herein, the channel quality may include at least one of SINR, carrier to interference and noise ratio (CINR), beam reference signal received power (BRSRP), reference signal received power (RSRP), reference signal received quality (RSRQ), received signal strength indicator (RSRI), error vector magnitude (EVM), bit error rate (BER), and block error rate (BLER).

According to various embodiments, the base station may determine the channel quality based on the CSI. For example, the base station may determine the channel quality (e.g., SINR) from the CSI (e.g., CQI) with respect to each carrier of the terminal. For example, the base station may determine the channel quality of another carrier of the terminal from the CSI of a specific carrier of the terminal.

According to various embodiments, the base station may determine new channel quality by applying an outer-loop rate control (OLRC) offset according to ACK/NACK of the terminal, to the channel quality. The base station may determine the offset using the HARQ information per carrier, and re-determine the channel quality by considering actual reception performance by subtracting the determined offset to the channel quality (e.g., SINR per carrier per beam).

The base station may determine the channel capacity for the carrier based on the determined channel quality. The base station may determine the channel capacity per carrier per beam, from the channel quality per carrier per beam. According to various embodiments, the relationship between the channel quality and the channel capacity may be adaptively determined by the reception performance of the terminal.

The channel capacity of the disclosure may indicate the data amount actually transmitted per unit resource. For example, the channel capacity may be determined based on the modulation scheme. For example, the channel capacity may be determined based on the code rate. For example, the channel capacity may be determined based on the MCS level. Hereafter, the channel capacity is a product of the modulation level (i.e., the modulation order) and the code rate, is a value including arbitrary integer and decimal from zero, and is an information amount delivered by one frequency tone. In other words, the channel capacity indicates the number of bits transmittable per OFDM symbol. For example, if the modulation scheme is 64 quadrature amplitude modulation (QAM) (modulation order: 6) and the code rate is 0.5, the channel capacity may be determined to 3 (6*0.5). For example, if the modulation scheme is 16 QAM (modulation order: 4) and the code rate is 0.75, the channel capacity may be determined to (4*0.75). The base station may calculate the channel capacity per beam or the channel capacity (e.g., modulation order product code rate (MPR)) per carrier, for each terminal.

The base station may determine the buffer usage for the carrier based on the determined channel capacity. The base station may repeatedly determine the buffer usage for each carrier, until determining the buffer usage corresponding to the total buffer occupancy of the terminal. The base station may distribute the buffer occupancy of the terminal, by sequentially determining the buffer usage for the carriers. Since the buffer usage is determined based on the channel information, the buffer occupancy may be adaptively distributed according to the change of the radio channel.

In operation 505, the base station may allocate resources. The base station may allocate the resources based on the buffer usage for each carrier. The base station may allocate the resources for the carriers based on the buffer usage of the carriers. The base station may determine the resource amount corresponding to the buffer usage for each carrier. The base station may determine a necessary resource amount, to transmit the buffer usage for each carrier. According to various embodiments, the base station may allocate the resources by considering bits added (hereafter, referred to as additional bits) according to information (e.g., control channel, sync signal, reference signal, channel coding) required in the data transmission corresponding to the buffer usage for each carrier. The base station may allocate the resources corresponding to a packet size including the bits corresponding to the buffer usage and the additional bits. The packet size may be a TB size or a sum of TB sizes.

The base station may determine the TB size corresponding to the buffer usage for each carrier. The base station may determine the modulation scheme or the code rate according to the channel information for each carrier. For example, the base station may determine the MCS level based on the channel information. The base station may determine the number of RBs for transmitting the data corresponding to the buffer usage for the carrier, based on the TB size and the MCS level. The base station may allocate the resources for the carriers to the terminal, according to the MCS level of the carriers and the number of the RBs.

In FIG. 5, the configuration for distributing the buffer occupancy of the terminal and allocating the resources by sequentially determining the buffer usage for the carriers for one terminal has been described. However, the carrier-based BO distribution of the disclosure may be also applied to scheduling not only a single terminal but also a plurality of terminals within the unit scheduling time. By repeating the carrier-based BO of FIG. 5 on each terminal, the base station may perform the scheduling on the plurality of the terminals within the unit scheduling time.

Figure 7:
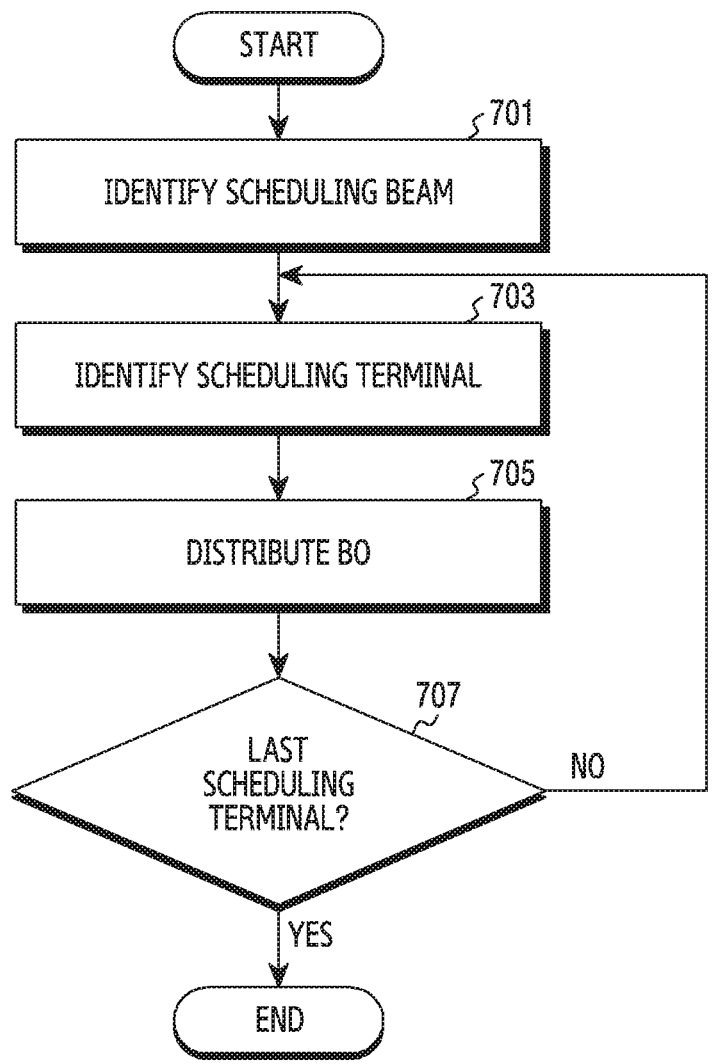
FIG. 7 illustrates a flowchart of a base station for carrier-based BO distribution according to various embodiments of the disclosure.
Figure 8:
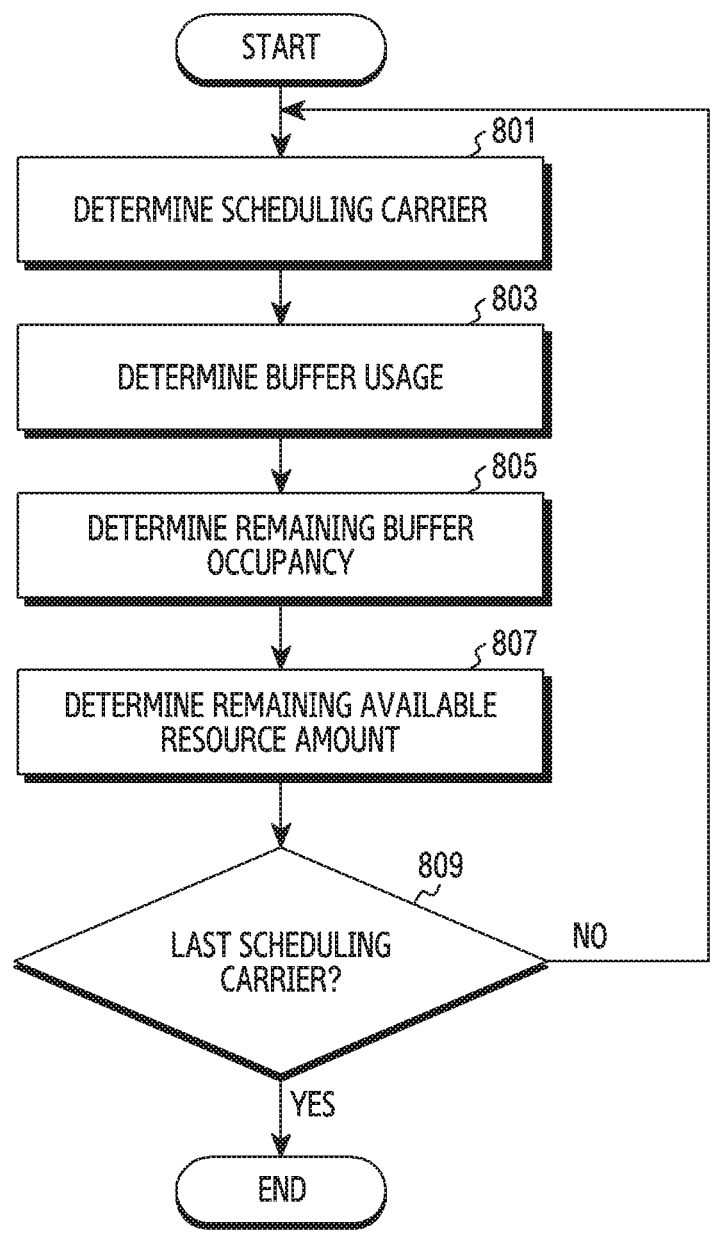
FIG. 8 illustrates a flowchart of a base station for carrier-based BO distribution for a terminal according to various embodiments of the disclosure.

Meanwhile, during the unit scheduling time, the resources may be shared by a plurality of terminals. A scheduling result of a particular carrier of a particular terminal may affect a scheduling result of the particular carrier of another terminal. Hence, the buffer usage for a specific carrier in the terminal may affect the buffer usage for another carrier in the terminal. Accordingly, the base station needs to instantaneously update a change of the available resources shared by the terminals and a change of the buffer usage of the terminal shared by the carriers. Now, FIGS. 6 through 8 provide a procedure for the carrier-based BO distribution and the scheduling for a plurality of terminals within the unit scheduling unit.

Figure 6:
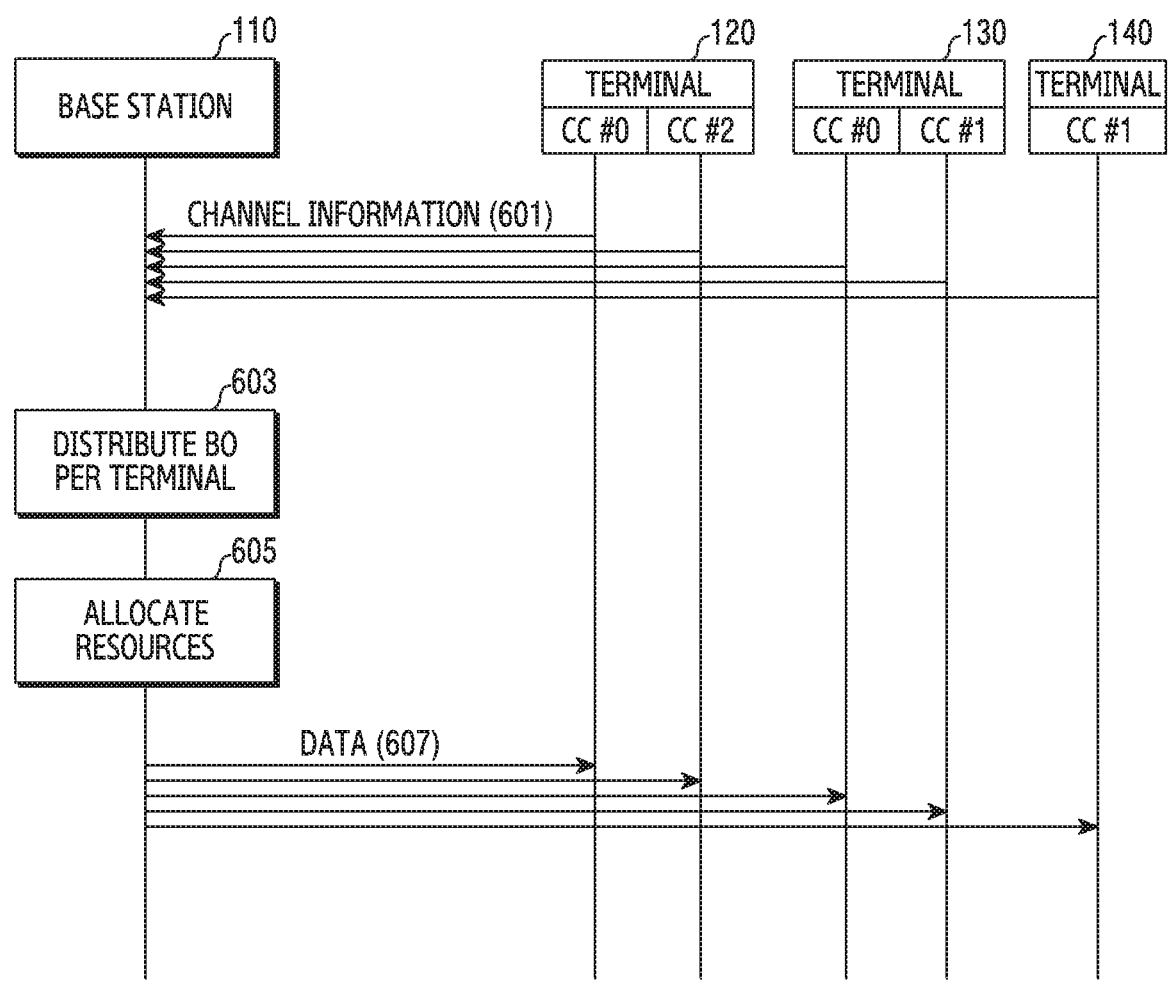
FIG. 6 illustrates a signal flow diagram for allocating resources through carrier-based BO distribution according to various embodiments of the disclosure.

FIG. 6 illustrates a signal flow diagram for allocating resources through carrier-based BO distribution according to various embodiments of the disclosure. The carrier-based BO distribution of the disclosure sequentially determines the buffer usage for each carrier and distributes total buffer occupancy of the terminal to carriers. FIG. 6 illustrates signals exchanged between the base station 110 and the terminals 120, 130, and 140. The terminal 120 and the terminal 130 (hereafter, referred to as CA terminals) support CA including two serving cells, and the terminal 140 (hereafter, referred to as a non-CA terminal) includes one serving cell.

Referring to FIG. 6, in operation 601, the base station 110 may receive channel information from the terminal 120, the terminal 130, or the terminal 140. Operation 601 corresponds to operation 501 of FIG. 5, and accordingly the same or similar parts to operation 501 shall be omitted.

The base station 110 may receive from the terminal 120, channel information regarding at least one of serving cells (e.g., CC #0, CC #2) of the terminal 120. For example, the base station 110 may receive from the terminal 120, the channel information (e.g., CQI) of the serving cells, that is, the channel information per carrier. For example, the base station 110 may receive only the channel information of a particular carrier (e.g., PCC). The carrier may be set for CA of the terminal 120. The explanations on the terminal 120 may be true for the terminal 130. The base station 110 may receive from the terminal 140, channel information regarding the serving cell (e.g., CC #1) of the terminal 140.

In operation 603, the base station 110 may perform the BO distribution per terminal. Based on the channel information, the base station 110 may perform the carrier-based BO distribution for each terminal. Operation 603 corresponds to operation 503 of FIG. 5, and accordingly the same or similar parts to operation 503 shall be omitted.

The base station 110 may obtain buffer occupancy of each terminal. The buffer occupancy of each terminal is forwarded from the PDCP layer or the RLC layer to the MAC layer. In the MAC layer, the base station 110 may obtain the buffer occupancy of each terminal.

The base station 110 may identify a scheduling terminal (e.g., the terminal 130, the terminal 140) to allocate the resource within the unit scheduling time. The base station 110 may identify at least one carrier (e.g., CC #0, CC #1) which is set at the scheduling terminal. To distribute the buffer occupancy of the terminal, the base station 110 may determine buffer usage corresponding to the identified carrier.

The base station 110 may repeat the carrier-based BO distribution for each of scheduling terminals. The base station 110 may repeat the carrier-based BO distribution for every scheduling terminal during the unit scheduling time. The base station 110 may sequentially identify the scheduling terminal according to a designated priority, and perform the carrier-based BO distribution for the identified scheduling terminal.

The base station 110 may determine the buffer usage by considering available resources for the carriers. The available resources for the carriers may be shared between the scheduling terminals. If determining the buffer usage for a specific carrier of a specific terminal (e.g., the terminal 130), the base station 110 may determine buffer usage of a specific carrier of another terminal (e.g., the terminal 140), based on the determined buffer usage and the available resources.

In operation 605, the base station 110 may allocate resources. Operation 605 corresponds to operation 505 of FIG. 5, and accordingly the same or similar parts to operation 505 shall be omitted.

The base station 110 may include a carrier scheduler for allocating the resources to the carriers. The base station 110 may allocate the resources on the carrier basis. The buffer occupancy is distributed on the terminal basis, whereas the resource allocation may be performed on the carrier basis.

The base station 110 transmits the buffer usage of each carrier of each terminal to each carrier scheduler. The base station 110 provides the buffer usage of the terminals for each carrier, to each carrier scheduler. For example, the base station 110 provides the buffer usage of the terminals 130 for CC #0 to the carrier scheduler. The base station 110 provides the buffer usage of the terminals 130 for CC #1 and the buffer usage of the terminals 140 for CC #1 to the carrier scheduler for CC #1.

The base station 110 may distribute and allocate total available resources for the carrier to the terminals based on the buffer usage of the terminals. Since the available resources are shared, except for the MU-MIMO, in the same carrier, the base station 110 may allocate the resources to the terminals in proportion to the buffer usage for the terminals. The base station 110 may allocate the resources corresponding to the buffer usage for each terminal, to the terminal.

According to various embodiments, the carrier scheduler in the base station 110 may operate independently. The base station 110 may allocate the resources for the carriers in parallel. For example, the scheduling of the terminal 140 for CC #1 and the scheduling of the terminal 130 for CC #0 may be performed in parallel. Thus, the total scheduling time may reduce.

The carrier scheduler may determine the MCS level and the number of RBs according to a full packet size corresponding to the buffer usage of a corresponding terminal in each carrier. In other words, the base station 110 independently performs virtual BO per carrier allocated according to carrier-based BO distribution results, that is, actual scheduling of the buffer usage for each carrier, through each carrier scheduling.

In operation 607, the base station 110 may transmit data. The base station 110 may transmit data to each of the scheduled terminals (e.g., the terminal 130, the terminal 140). The base station 110 may transmit data to each terminal using at least one carrier. The base station 110 may transmit data to the terminal, over a frequency region corresponding to the number of the RBs of the scheduling result of operation 605. The base station 110 may transmit the data over a shared channel (e.g., physical downlink shared channel (PDSCH)). The base station 110 may transmit to the terminal, DCI (e.g., RB assignment field) indicating RB allocation on a control channel (e.g., PDCCH together with the data. The terminal may decode the DCI and receive the data over its allocated frequency region.

According to various embodiments, whether the carrier-based BO distribution of the disclosure is fulfilled or not may be identified from the DCI. The DCI may indicate the resource amount allocated to the terminal. In the carrier-based BO distribution, the maximum number of transmittable bits, that is, the entire remaining buffer amount in the maximum packet size may be allocated in the last carrier scheduled. According to various embodiments of the disclosure, if the buffer occupancy of the terminal is changed, the last buffer usage distributed to the terminal may change. Whether the carrier-based BO distribution of the disclosure is fulfilled may be identified from the change of the resource allocated to the terminal using a specific carrier.

The scheduling of FIG. 6 may increase the transmission capacity or the throughput in the cell of the base station. By applying the carrier-based BO distribution as shown in FIG. 6, the number of the terminals allocated the resources during the unit scheduling time may increase. For example, the increase of the terminals in number according to the carrier-based BO distribution of the disclosure may be identified from the change of the terminal of the lowest priority among the terminals allocated the resources.

The scheduling using the carrier-based BO distribution for the terminal has been described in FIG. 5 and FIG. 6. Now, detailed operations of the base station for the carrier-based BO distribution are explained in FIG. 7 and FIG. 8.

FIG. 7 illustrates a flowchart of a base station for carrier-based BO distribution according to various embodiments of the disclosure. The carrier-based BO distribution of the disclosure sequentially determines the buffer usage for each carrier and thus distributes the BO to each carrier. The base station may be the base station 110 of FIG. 1. FIG. 7 illustrates operation 503 of FIG. 5 or operation 603 of FIG. 6.

Referring to FIG. 7, in operation 701, the base station may identify a scheduling beam. According to various embodiments, since a communication system (e.g., pre 5G or NR) supporting high frequency band supports the beamforming, the base station may perform the scheduling on the beam basis during the unit scheduling time. The base station may identify terminals served by one or more beams within the unit scheduling time, as the scheduling terminals.

The base station may determine a beam corresponding to a current unit scheduling time, that is, the scheduling beam. The base station may identify one or more scheduling beams according to priority, among a plurality of beams. For example, the base station 110 may identify the beam 113 of FIG. 1 as the scheduling beam. For example, using MU-MIMO, the base station may identify two or more scheduling beams. For example, if the beam 111 and the beam 113 are spatially divided and allocated within the same scheduling time, the base station may identify both of the beam 111 and the beam 113 of FIG. 1 as the scheduling beams.

The base station may determine one or more terminals corresponding to the one or more scheduling beams. The terminal corresponding to the scheduling beam according to various embodiments may indicate a terminal served by the scheduling beam. Hereafter, the one or more terminals may be referred to as a scheduling terminal set and each terminal may be referred to as the scheduling terminal for the sake of explanations. For example, if identifying the beam 113 of FIG. 1 as the scheduling beam, the base station 110 may determine the terminal 130 and the terminal 140 as the scheduling terminal set. For example, if identifying the beam 111 of FIG. 1 as the scheduling beam, the base station 110 may determine the terminal 120 as the scheduling terminal.

Using the SU-MIMO, the base station may determine at least one terminal served by the scheduling beam, as the scheduling terminal. For example, since the terminal 120 is served by other beam (e.g., the beam 111), the base station 110 may perform the scheduling for the terminal 120 within a different unit schedule time from the terminal 130. The base station 110 may determine the terminal 120 as the scheduling terminal. In some embodiments, if using the MU-MIMO, the base station may determine terminals served by spatially divided beams, as the scheduling terminals. For example, the base station 110 may perform the scheduling for the terminal 120 with the terminal 130 and the terminal 140 during the same unit scheduling time. That is, in the same unit scheduling time, the base station 110 may determine the terminal 120 as well as the terminal 130 and the terminal 140, as the scheduling terminals.

In operation 703, the base station may identify the scheduling terminal. The base station may identify one scheduling terminal in the scheduling terminal set. The base station may identify one scheduling terminal among the one or more terminals corresponding to the scheduling beam. The base station may identify the scheduling terminal for the carrier-based BO distribution.

According to designated priorities, the base station may identify the scheduling terminal for the carrier-based BO distribution among one or more scheduling terminals. For example, the designated priority may be a priority of a radio bearer which is set per terminal. For example, the priority may be based on the channel state of each terminal. For example, the priority may be determined based on fairness. For example, if the priority of the radio bearer of the terminal 130 is higher than the priority of the radio bearer of the terminal 140, the base station may identify the terminal 130 for the BO distribution and then identify the terminal 140. If a single terminal corresponds to the scheduling beam, the base station may identify the single terminal as the scheduling terminal.

According to determining of operation 707 to be explained, the base station may sequentially identify the scheduling terminals. The base station may sequentially identify the scheduling terminals according to the designated priorities.

In operation 705, the base station may perform the BO distribution. The base station may perform the carrier-based BO distribution on the scheduling terminal. The base station may identify carriers which are set in the terminal of the carrier-based BO distribution. For example, for the carrier-based BO distribution of the terminal 130, the base station 110 may identify CC #0 and CC #1 of the terminal 130. For example, for the BO distribution of the terminal 140, the base station 110 may identify CC #1 of the terminal 140.

The base station may determine buffer usage with respect to the identified carriers in sequence. The base station may determine remaining buffer occupancy by excluding the buffer usage for the carrier of the terminal from the buffer occupancy of the terminal. The base station may determine the buffer usage for a next carrier from the remaining buffer occupancy. The base station may repeatedly determine the buffer usage for each carrier until total buffer usage corresponding to total buffer occupancy is determined. For example, the base station may determine the buffer usage for CC #0 from the BO of the terminal 130, and determine the remaining BO by excluding the buffer usage for CC #0 from the BO. The base station may determine the buffer usage for CC #1 from the remaining BO.

In operation 707, the base station may determine whether the scheduling terminal identified in operation 703 is the last scheduling terminal. The base station may determine whether the BO distribution is conducted on every terminal of the scheduling set determined in operation 701. That is, the base station may determine whether the carrier-based BO distribution is conducted on all of one or more scheduling terminals corresponding to the scheduling beam. For example, the base station may determine whether the carrier-based BO distribution is performed on the terminal 130 and the terminal 140.

If the terminal identified in operation 703 is the last scheduling terminal, the base station may finish this process. If the terminal identified in operation 703 is not the last scheduling terminal, the base station may return to operation 703. Next, the base station may identify another scheduling terminal in operation 703. The base station may identify another scheduling terminal in the terminals of the scheduling terminal set. For example, if identifying the terminal 130 in operation 703 of a previous cycle, the base station may identify the terminal 140 as the scheduling terminal in operation 703 of a current cycle.

The base station may repeat the BO distribution on every scheduling terminal during the unit scheduling time. The base station may repeat the carrier-based BO distribution on every scheduling terminal. For example, after conducting the BO distribution on the terminal 130, the base station may perform the BO distribution on the terminal 140. Since the carrier-based BO distribution is repeated for each terminal, the number of repetitions of the cycle (including operation 703 through operation 707) which distributes the BO, rather than zero, may increase.

In FIG. 7, the disclosure has described that the base station determines the scheduling terminals for one or more scheduling beams and repeats operation 703 through operation 707 for each scheduling terminal, but not limited to. According to an embodiment, if a plurality of scheduling beams is configured within the unit scheduling, the base station may repeat the BO distribution per terminal of FIG. 7 for the scheduling beams.

FIG. 8 illustrates a flowchart of a base station for carrier-based BO distribution for a terminal according to various embodiments of the disclosure. The base station may be the base station 110 of FIG. 1. FIG. 8 illustrates operation 503 of FIG. 5 or operation 705 of FIG. 7. The terminal indicates a scheduling terminal.

Referring to FIG. 8, in operation 801, the base station may determine a scheduling carrier. The base station may identify one or more carriers which are set at the scheduling terminal. For example, if the scheduling terminal is the terminal 130 supporting the CA, the base station 110 may identify two carriers CC #0 and CC #1. For example, if the scheduling terminal is the terminal 140 not supporting the CA, the base station 110 may identify the single carrier CC #1.

The base station may identify a scheduling carrier to determine buffer usage, among the one or more identified carriers. The scheduling carrier in this disclosure indicates the carrier identified to determine the buffer usage. The buffer usage is a virtual BO value distributed and allocated from BO, and is used to predict a resource amount allocated for actual scheduling.

The base station may determine a carrier (hereafter, referred to as an initial carrier) for determining the buffer usage first, among the one or more identified carriers. The base station may sequentially distribute the BO of the terminal starting from the initial carrier, according to CA capability of the terminal According to various embodiments, the initial carrier may change per scheduling time. For example, the initial carrier may be determined based on an index of a cell (Pcell) for PCC and an offset value. For example, the initial carrier may be determined based on Equation 1.

$$i_0 = (\text{Pcell index} + \text{offset}) \bmod I \qquad \text{Equation 1}$$

In Equation 1, $i_0$ denotes the cell index of the initial carrier, Pcell index denotes the index of the Pcell, offset denotes a set offset value, and I denotes the total number of carriers of the terminal. The offset may be determined in various ways. For example, the base station may determine the offset value per scheduling time in a cyclic manner. For example, the base station determines a value increased by one for each scheduling time (or air time). For example, the base station may randomly determine the offset value per scheduling time.

The base station may repeatedly identify the identified scheduling carriers in operation 809 to be explained. The base station may sequentially identify the scheduling carriers for determining the buffer usage starting from the initial carrier, until remaining buffer usage of the terminal becomes zero.

In operation 803, the base station may determine the buffer usage. The base station may determine the buffer usage corresponding to the identified scheduling carrier. The base station may determine the buffer usage corresponding to the scheduling carrier, from channel information of the scheduling carrier.

The base station may determine the buffer usage corresponding to the identified carrier (e.g., CC #0, CC #1). For example, the base station 110 may determine the buffer usage corresponding to each carrier based on the channel information received from the identified terminal 130. For example, the channel information may be related to CC #0 or CC #1. For example, the channel information may be related to the beam 113 which serves the terminal 130.

The base station may determine an available resource amount. The base station may determine the available resource amount per carrier. The base station may determine a physical resource amount allocable to the scheduling carrier. For example, the base station may determine the number of RBs allocated to the scheduling carrier. In the following, the number of the RBs is referred to as the number of available RBs or the number of remaining RBs (RRBs).

The available resource amount may be set per carrier. The terminals of FIG. 8 may share the available resource amount. A resource amount allocated to a specified terminal may be subordinate to a resource amount allocated to another terminal. According to various embodiments, an initial value of the available resource amount may be set to the maximum number of RBs allocable in the scheduling carrier. For example, if the carrier-based BO distribution is performed on a first scheduling terminal, the available resource amount may be set to the maximum number of RBs allocable in the carrier. This is because a previous terminal does not use any resources in each scheduling carrier. For example, if the carrier-based BO distribution is performed on a MU-MIMO terminal, the available resource amount may be set to the maximum number of RBs allocable in the carrier. The MU-MIMO terminals may transmit a signal by spatially dividing the signal even if the same time-frequency resources are allocated.

Since the carrier-based BO distribution is repeated per terminal, the available resource amount for a specified carrier may be zero. If the available resource amount for a specified carrier is zero, the resource allocation may not be performed on the scheduling carrier. In addition, the base station may not allocate more resources than the available resources. Hence, for the carrier-based BO distribution, the base station may determine the available resource amount. According to various embodiments, the base station may determine the buffer usage by considering the available resources for the scheduling carriers.

The base station may obtain a channel capacity. The base station may determine the channel capacity based on CSI (e.g., CQI) or HARQ information (ACK/NACK) received from the terminal. The channel capacity may indicate a data amount per unit scheduling resource. The base station may determine a transmittable data amount per unit resource per carrier of the terminal. According to various embodiments, the channel capacity may be determined in operation 503 of FIG. 5. The channel capacity may be the product of the modulation order and the code rate. The base station may determine the number of transmittable bits per symbol.

The base station may determine the number of layers. The base station may determine the number of the layers per TB based on the CSI (e.g., RI) received from the terminal. The base station may determine relationship of the number of the layers per TB from the RI value according to a preset rule. Herein, the preset rule may be defined according to a communication standard supported in the communications between the base station and the terminal. For example, as the total number of the layers increases, the layers may be sequentially distributed per TB. For example, if the RI value is 3 (i.e., four ranks), the number of the layers per TB may be 2. For example, as the total number of the layers increases, the layers may be distributed to a first TB up to a specific number and then distributed to a second TB. For example, if the RI value is 1 (i.e., two ranks), the number of the layers of the first TB may be 2. For example, if the RI value is 3 (i.e., four ranks), the number of the layers of the first TB may be 4. For example, if the RI value is 6, the number of the layers per TB may be 3.

The base station may determine an effective resource rate. Herein, the effective resource rate may indicate a rate of unit resources used in actual data transmission. The base station may determine the effective resource rate according to the number of resources excluding a control region, a reference signal, and a sync signal from the resources. For example, the base station may determine the number of tones (tone per RB) used for the data transmission per RB. That is, the base station may determine the number of resource elements (REs) per RB. The determined number of the RBs may be referred to as effective REs.

The base station may determine current BO. The current BO indicates a buffer amount not distributed to the carriers in the total BO provided from the RLC of the terminal. If repeating operation 809 to be described, the base station may determine remaining BO of the previous cycle as the current BO. The BO of the initial carrier may be determined to the total BO of the terminal. Next, the BO for the carrier may be obtained by excluding the buffer usage of the previous carrier form the total BO.

The base station may determine the buffer usage for the scheduling carrier, based on the available resource amount, the channel capacity, the effective resource rate, and the current BO. For example, the buffer usage may be determined based on Equation 2.

$$BO(i,n)=\min(MRP(i)\times RRB(i)\times E\times L, BO(n)) \quad \text{Equation 2}$$

In Equation 2, BO(i,n) denotes buffer usage for an i-th carrier of an n-th terminal, MRP(i) denotes channel capacity for the i-th carrier, RRB(i) denotes the number of available RBs for the i-th carrier, E denotes the number of effective REs per RB, L denotes the number of layers per terminal, and BO(n) denotes the current BO of the n-th terminal. MRP(i)×RRB(i)×E×L denotes the number of transmittable bits.

According to an embodiment, if determining all the buffer usages corresponding to the total BO of the terminal, the base station may determine the buffer usage for the scheduling carrier as zero. According to another embodiment, if determining all the buffer usages corresponding to the total BO of the terminal, the base station may not additionally perform the BO distribution. That is, unlike FIG. 8, the base station may finish the carrier-based BO distribution, without additionally repeating the operations (operation 803 through operation 809).

In operation 805, the base station may determine the remaining BO. The remaining BO may be referred to as the remaining buffer amount or the remaining BO of the terminal. The base station may determine the remaining BO based on the current BO of the terminal and the buffer usage for the scheduling carrier. The base station may determine the remaining BO by extracting the buffer usage determined in operation 803 from the current BO. For example, the remaining BO may be determined based on Equation 3.

$$BO\_remain(n)=\max(BO(n)-BO(i,n),0) \quad \text{Equation 3}$$

In Equation 3, BO_remain(n) denotes the remaining BO of the n-th terminal. BO(n) denotes the current BO of the n-th terminal, and BO(i,n) denotes the buffer usage for the i-th carrier of the n-th terminal. If repeating operation 809 to be described, the base station may determine the remaining BO BO_remain(n) as current BO of a next cycle. That is, the base station may update the current BO BO(n) of the terminal.

According to various embodiments, after finishing the scheduling using virtual BO, the base station may update the remaining BO of a current RLC layer based on a size of TBs (e.g., transport block size (TBS)) allocated to the actual scheduling, rather than the virtual BO.

The base station may repeatedly determine the remaining BO by determining the buffer usage for each carrier and excluding the determined buffer usage in operation 809. For example, the base station 110 may calculate total buffer usage of the terminal 130, that is, the buffer usage to be distributed per carrier, per beam in the BO. The base station 110 may determine the remaining BO by excluding the buffer usage for CC #0 in the BO of the terminal 130. The base station 110 may recalculate the remaining BO by excluding the buffer usage for CC #1 from the remaining BO.

In operation 807, the base station may determine a remaining available resource amount. The base station may determine the remaining available resource amount based on the buffer usage. The base station may determine the remaining available resource amount based on the available resource amount and the buffer usage. The base station may determine the remaining available resource amount for the scheduling carrier, based on the available resource amount for the scheduling carrier and the buffer usage for the scheduling carrier. That is, the available resource amount and the remaining available resource amount may be determined on the scheduling basis.

The base station may determine the remaining available resource amount, by excluding the resource amount to allocate from the available resource amount determined in operation 803. Herein, the resource amount to allocate is a resource amount allocated by the base station to the terminal for the actual scheduling, and the base station may determine the resource amount to allocate for the scheduling carrier, based on the buffer usage determined in operation 803.

The base station may determine the remaining available resource amount, with the number of the RBs. For example, the remaining available occupancy may be determined based on Equation 4.

$$RRB\_remain(i) = \max\left(RRB(i) - \frac{BO(i, n)}{MPR(i) \times E \times L}, 0\right) \quad \text{Equation 4}$$

In Equation 4, RRB_remain(i) denotes the remaining available resource amount for the i-th carrier, and its unit may be the number of the RBs. RRB(i) denotes the number of available RBs for the i-th carrier, BO(i,n) denotes the buffer usage for the i-th carrier of the n-th terminal, MPR(i) denotes the channel capacity for the i-th carrier, I denotes the number of effective REs per RB, and L denotes the number of layers per terminal. If repeating the carrier-based BO distribution per terminal in operation 809 to be described or in operation 607 of FIG. 6, the base station may determine the remaining available resource amount RRB_remain(i) as the available resource amount of the i-th scheduling carrier of another terminal That is, the base station may update the available resource amount RRB(i).

In operation 809, the base station may determine whether the carrier determined in operation 803 is the last scheduling carrier. The base station may determine whether the BO usage is determined for every carrier of the scheduling terminal. If the carrier determined in operation 803 is the last scheduling carrier, the base station may finish this process. If the carrier determined in operation 803 is not the last scheduling carrier, the base station may return to operation 803. The base station may identify other scheduling carrier in operation 803.

The base station may repeatedly determine the buffer usage for each carrier until the buffer usage corresponding to the total BO is determined. By sequentially determining the buffer usage for the carriers, the base station may distribute the BO of the terminal.

While the base station repeatedly determines the buffer usage per carrier of the terminal which supports the CA in FIG. 8, the carrier-based BO distribution of the disclosure may be applied to the terminal not supporting the CA, that is, to the non-CA terminal. That is, the carrier-based BO distribution may include determining, at the base station 110, the buffer usage for the single carrier in the BO of the terminal 140 served only by one carrier. In this case, the repetitive process based on the determination of operation 809 FIG. 8 is not conducted. Even though the BO of the non-CA terminal is distributed only for a single carrier, available resources may exist for the carrier of the non-CA terminal after the BO distribution of another terminal having a higher priority. That is, for example, even though the BO of the terminal 140 is distributed only for CC #1, it is likely that available resources may exist for CC #1 of the non-CA terminal 140 after the BO distribution of the terminal 130 having the higher priority.

In FIG. 8, operation 807, but not limited to, follows operation 805. The base station may determine the remaining available resource amount and then determine the remaining BO.

According to various embodiments of the disclosure, if the BO of the terminal changes, the size of the BO distributed lastly, that is, the buffer usage for the last carrier for the BO distribution may change.

The base station may identify the last carrier of the buffer usage determined as non-zero among the scheduling carriers of the terminal. The buffer usage of the identified carrier may be in a size corresponding to the total remaining buffer amount of the terminal in a corresponding cycle. If the BO of the terminal is changed, the buffer usage for the identified carrier may change. Whether to perform the carrier-based BO distribution of the disclosure may be identified, through the buffer usage change of a specified carrier, based on the change of the total BO of the terminal. For example, for the CA, the buffer usage of the terminal may be set to 25 and three carriers may be set in the terminal. A maximum packet size may be 10. The base station may determine the buffer usage for two carriers, as 10 and determine the buffer usage for the last carrier as 5. If the buffer usage of the terminal is changed to 28, the base station may determine the buffer usage for the last carrier as 8.

In FIG. 5 through FIG. 8, the carrier-based BO distribution has been described for the scheduling between the base station and the terminal. Now, FIG. 9 illustrates an example of carrier-based BO distribution for two terminals, and FIG. 10 illustrates an example of determining an initial carrier.

Figure 9:
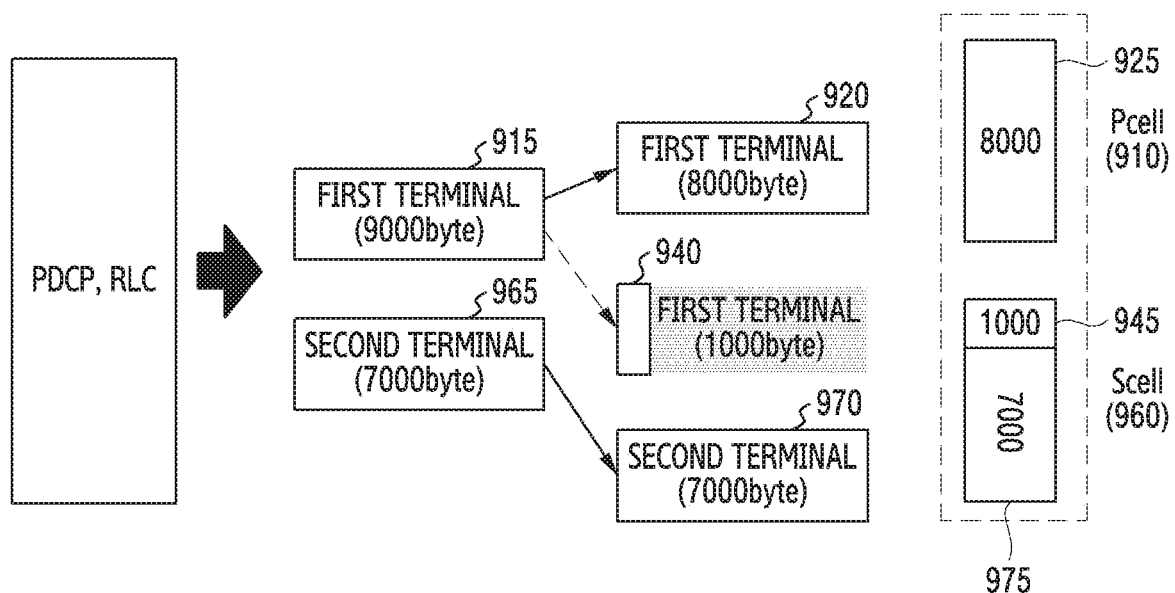
FIG. 9 illustrates an example of carrier-based BO distribution according to various embodiments of the disclosure.
Figure 10:
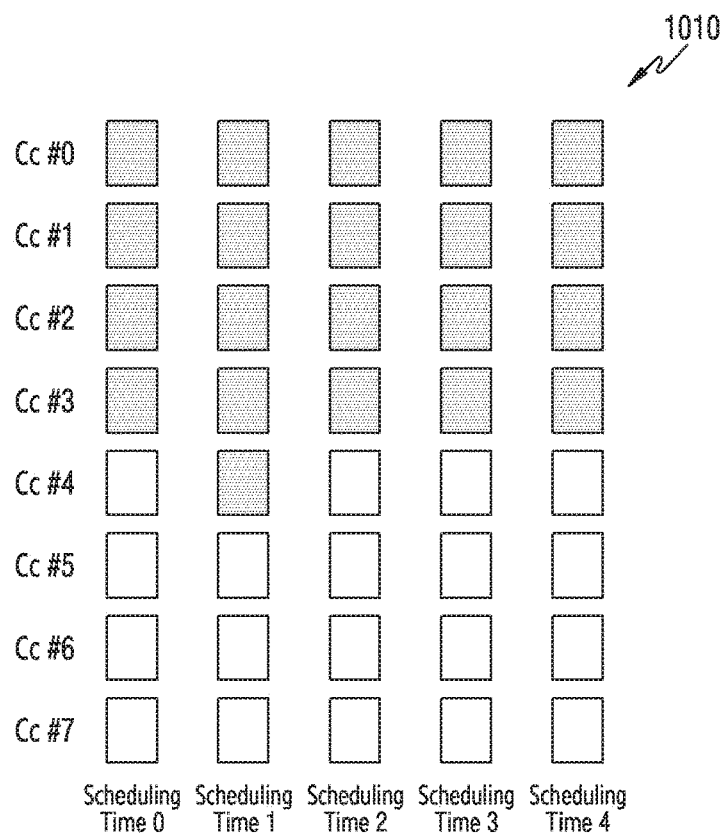
FIG. 10 illustrates an example of determining an initial carrier for carrier-based BO distribution according to various embodiments of the disclosure.
Figure 10:
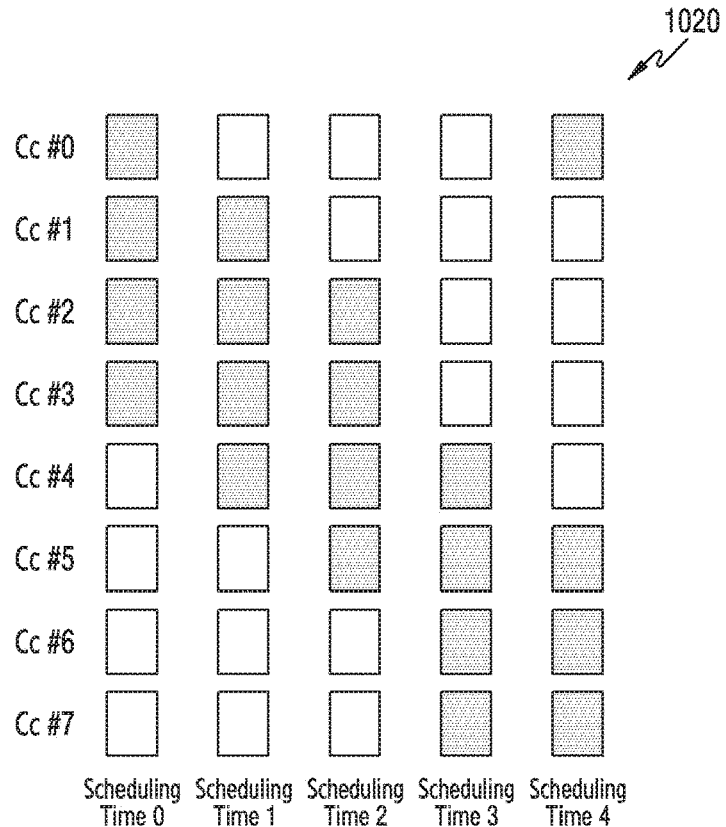

FIG. 9 illustrates an example of the carrier-based BO distribution according to various embodiments of the disclosure.

Referring to FIG. 9, the base station may perform the carrier-based BO distribution for each of a first terminal and a second terminal. The first terminal and the second terminal may be scheduled within the same unit scheduling time. For example, it may be assumed that the first terminal and the second terminal are served by the same beam of the base station. A priority of the first terminal is higher than a priority of the second terminal, and both of the first terminal and the second terminal set the CA for the same two carriers. The two carriers may be a PCC 910 for a Pcell and a SCC 960 for a Scell.

The base station may obtain first BO 915 of the first terminal and second BO 965 of the second terminal, which are transferred from the PDCP layer and the RLC layer to the MAC layer. The first BO 915 may be 9000 bytes, and the second BO 965 may be 7000 bytes. A maximum packet size (a TBS for the layers or a sum of TBSs) of each carrier may be 8000 bytes. The base station may perform the BO distribution of each terminal, through the central scheduler. The base station may perform the carrier-based BO distribution for the first terminal, according to the priority.

If the base station determines the same buffer usage 8000 bytes for the Pcell and the Scell with respect to the first terminal, resources of 8000 bytes are actually allocated to the Pcell of the first terminal because the priority of the first terminal is higher than the priority of the second terminal. In so doing, resources of 8000 bytes are also allocated to the Scell of the first terminal because the priority of the first terminal is higher than the priority of the second terminal. However, since only 1000 bytes of 8000 bytes are actually used in the data transmission, the base station allocates the resources by padding a region corresponding to the remaining 7000 bytes. That is, since the remaining 7000 bytes are allocated to the first terminal, the base station may not allocate resources to the second terminal in the Scell.

According to various embodiments of the disclosure, the base station sequentially performs the BO distribution per carrier with respect to the first terminal. The base station determines first buffer usage 920 of 8000 bytes which is a limit of the total carrier capacity to the Pcell of the first terminal. The base station determines second buffer usage 940 of the remaining 1000 bytes to the Scell of the first terminal.

After performing the carrier-based BO distribution on the first terminal, the base station may conduct the carrier-based BO distribution on the second terminal. Since the Pcell of the second terminal having the low scheduling priority has no remaining available resources (e.g., RB), the base station may identify the remaining available resources of the Scell. The base station determines third buffer usage 9740 of 7000 bytes from the remaining available resources.

The base station may provide the buffer usage determined at the central scheduler to each carrier scheduler. The base station may allocate resources corresponding to the buffer usage, through each carrier scheduler. The carrier scheduler for the Pcell may allocate resources 925 corresponding to the first buffer usage 920 to the first terminal. The carrier scheduler for the S cell may allocate resources 945 corresponding to the second buffer usage 940 to the first terminal, and allocate resources 975 corresponding to the third buffer usage 970 to the second terminal.

By scheduling both terminals within the same scheduling time through the carrier-based BO distribution, the base station may increase the cell throughput by increasing the number of the scheduling terminals and reducing the number of padding bits.

FIG. 10 illustrates an example of determining an initial carrier for carrier-based BO distribution according to various embodiments of the disclosure. The base station may sequentially determine buffer usage for carriers of a terminal starting with the initial carrier. The base station may perform the BO distribution starting from the initial carrier. In the following, FIG. 10 describes that the terminal supports CA which aggregates eight carriers.

Referring to FIG. 10, the base station may perform the scheduling on the terminal using four carriers on average. The number of carriers to schedule may be determined from BO of the terminal.

The base station may determine the initial carrier. The base station may determine the carrier of which the buffer usage is determined first during the unit scheduling time, that is, the initial carrier. In some embodiments, the base station may fixedly determine the initial carrier (hereafter, a first scheme). For example, as shown in first scheduling results 1010, the base station may determine CC #0 as the initial carrier. The base station may determine the buffer usage starting from CC #0 per unit scheduling time, and perform the scheduling.

In some other embodiments, the base station may adaptively determine the initial carrier (hereafter, a second scheme). The base station may change a location of the initial carrier per unit scheduling time, determine the buffer usage starting from the changed initial carrier, and perform the scheduling. For example, as shown in second scheduling results 1020, the base station may determine the location of the initial carrier to CC #0, CC #1, CC #2, and CC #4, and CC #5 in order for every scheduling time.

If the frequency of resource allocations varies per carrier, link adaptation for some channels may not be performed smoothly. For example, if a moving speed of the terminal is 120 km/h, about two carriers on average are buffered continuously, and adaptive modulation coding (AMC) is applied, the scheduling using the second scheme may provide a higher gain than the scheduling using the first scheme. In the scheduling using the second scheme, a deviation of the resource allocations per carrier decreases and thus the gain of OLRC is maximized. The scheduling using the first scheme may lack link adaptation information of specified carriers (e.g., CC #4 through CC #7), that is, ACK/NAKC for the OLRC. The base station may acquire more link adaptation information than the scheduling using the first scheme, in the scheduling using the second scheme, that is, by changing the location of the initial carrier in every scheduling time. The base station may rapidly determine an optimal MCS level per carrier, thus improving data transmission efficiency.

Compared with the resource allocation concentrated on a specific carrier (the first scheme), if the resources are allocated evenly to all the carriers (the second scheme), the increase of the AMC scheme gain, that is, the throughput (Tput) (unit: bit/s) per carrier is identified. Specific simulation results are shown in Table 1.

TABLE 1

| Gain | Initial Carrier | CC #0 | CC #1 | CC #2 | CC #3 | Total | Effect |
|---|---|---|---|---|---|---|---|
| Tput/ CC | First scheme | 234.3 | 234.3 | 177.1 | 177.9 | 823.6 | Reference |
| | Second Scheme | 234.2 | 234.3 | 234.3 | 234.7 | 937.5 | 114% |

If a channel quality deviation between the carriers is considerable, or if a CQI report provided only in the Pcell is inaccurate or a reception and filtering cycle is long, link adaptation time based on the channel change between the base station and the terminal may be delayed. With the long link adaptation time, the scheduling effect of the second scheme may be further maximized. In addition, the scheduling effect of the second scheme may further increase with more carriers set for the CA.

The carrier-based BO distribution of the disclosure may be applied to not only the CA in a single base station but also the CA between base stations. For example, a base station serving the Pcell may determine a carrier of the Scell served by another base station, that is, the buffer usage for the SCC.

While the carrier-based BO distribution of the disclosure has been described based on the downlink, it may be applied to the resource allocation for uplink transmission of the terminal. According to an embodiment, the BO of the terminal may be determined based on buffer status report.

By means of the carrier-based BO distribution of the disclosure, the base station may minimize the resource waste of a specific carrier and allocate the resources for data of the carriers. The base station may maximize the sum of data rates of the terminals. As more terminals frequently transmit a small packet or more terminals are allocated the resources within the same scheduling time, the throughput increase of the disclosure may be maximized. Additionally, by not concentrating the resource allocation on a specific carrier, an optimal modulation scheme or code rate per carrier may be determined even in a channel under considerable wireless environment change. Herein, the optimal modulation scheme or code rate may not exceed a designated threshold error rate and may provide the greatest transmission rate. By means of the optimal modulation scheme or code rate, the data transmission rate using the carriers of the terminal may be maximized.

An apparatus and a method according to various embodiments of the disclosure determine the buffer usage per CC, thus achieving the efficient resource allocation.

Further, an apparatus and a method according to various embodiments of the disclosure may determine the radio channel state more accurately, by not concentrating the buffer usage on a specific CC.

In this disclosure, to determine whether a specific condition is fulfilled or not, expressions such as 'equal to or greater than' or 'equal to or less than' are used by way of example and expressions such as exceed or fall below are not excluded. A condition defined with 'equal to or greater than' may be replaced by 'greater than', a condition defined with 'equal to or less than' may be replaced by 'less than', and a condition defined with 'equal to or greater than and less than' may be replaced by 'greater than and equal to or less than'.

As set forth above, an apparatus and a method according to various embodiments of the disclosure may reduce the wasted resources, by using the non-preferred beam.

The methods according to the embodiments described in the claims or the specification of the disclosure may be implemented in software, hardware, or a combination of hardware and software.

As for the software, a non-transitory computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (e.g., software module, software, etc.) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   receiving, from a first terminal, first channel information corresponding to a first carrier and second channel information corresponding to a second carrier;
   identifying first buffer usage for the first carrier from buffer occupancy (BO) of the first terminal based on the first channel information;
   identifying second buffer usage for the second carrier from a remaining of the BO excluding the first buffer usage based on the second channel information;
   allocating resources corresponding to the first buffer usage to the first carrier; and
   allocating resources corresponding to the second buffer usage to the second carrier.

2. The method as claimed in claim 1, further comprising:
   receiving, from a second terminal, third channel information corresponding to the second carrier;
   identifying third buffer usage for the second carrier from BO of the second terminal based on the third channel information; and
   allocating resources corresponding to the third buffer usage to the second carrier.

3. The method of as claimed in claim 2, wherein the identifying of the third buffer usage comprises:
   identifying the allocated resources for the first terminal among available resources for the second carrier; and
   identifying the third buffer usage based on a remaining of the available resources excluding the allocated resources.

4. The method as claimed in claim 1, further comprising:
   identifying buffer usage for an i-th carrier from a remaining BO of the first terminal based on channel information corresponding to the i-th carrier;
   updating the remaining BO based on the buffer usage for the i-th carrier; and
   identifying buffer usage for an (i+1)-th carrier from the updated remaining BO based on the channel information corresponding to the (i+1)-th carrier,
   wherein the channel information comprises channel state information (CSI) including at least one of a channel quality indicator (CQI) or a rank indicator (RI).

5. The method as claimed in claim 4,
   wherein the identifying of the buffer usage for the i-th carrier comprises:

determining a modulation order, a first code rate, and the number of layers for the i-th carrier based on CSI of the i-th carrier;

updating an available resource amount for the i-th carrier based on the buffer usage for the i-th carrier; and identifying buffer usage for the i-th carrier based on the modulation order, the code rate, the number of the layers, and the available resource amount for the i-th carrier.

6. The method as claimed in claim 5, wherein the buffer usage for the i-th carrier is determined based on the following equation, $$BO(i,n)=\min(MRP(i)\times RRB(i)\times T\times L, BO(n))$$

where n denotes a n-th terminal, BO (1,n) denotes the buffer usage for the i-th carrier, MRP(i) denotes channel capacity for the i-th carrier, RRB (i) denotes the number of resource blocks (RBs) corresponding to the available resource amount for the i-th carrier, T denotes the number of resource elements used to transmit data per RB, L denotes the number of the layers, and BO (n) denotes a remaining buffer amount of the n-th terminal.

7. The method as claimed in claim 5, further comprising:
identifying buffer usage of the second terminal for the i-th carrier based on CSI of the second terminal and the updated available resources amount for the i-th carrier;
allocating resources corresponding to the buffer usage of the first terminal to the i-th carrier; and
allocating resources corresponding to the buffer usage of the second terminal to the i-th carrier.

8. The method as claimed in claim 1, wherein the first carrier is configured differently in each scheduling interval among a plurality of carriers.

9. The method as claimed in claim 1, further comprising: transmitting data to the first terminal via the resources allocated to the first carrier and the second carrier,
wherein, if the BO of the first terminal is changed, the second buffer usage is changed.

10. A base station in a wireless communication system, the base station comprising:
at least one transceiver; and
at least one processor operably coupled with the at least one transceiver,
wherein the at least one processor is configured to:
receive, from a first terminal, first channel information corresponding to a first carrier and second channel information corresponding to a second carrier,
identify first buffer usage for the first carrier from buffer occupancy (BO) of the first terminal based on the first channel information,
identify second buffer usage for the second carrier from a remaining of the BO excluding the first buffer usage based on the second channel information,
allocate resources corresponding to the first buffer usage to the first carrier, and
allocate resources corresponding to the second buffer usage to the second carrier.

11. The base station of claim 10, wherein the at least one processor is further configured to:
receive, from a second terminal, third channel information corresponding to the second carrier,
identify third buffer usage for the second carrier from BO of the second terminal based on the third channel information, and
allocate resources corresponding to the third buffer usage to the second carrier.

12. The base station of claim 11, wherein the at least one processor is further configured to:
identify the allocated resources for the first terminal among available resources for the second carrier, and
identify the third buffer usage based on a remaining of the available resources excluding the allocated resources.

13. The base station of claim 10, wherein the at least one processor is further configured to:
identify buffer usage for an i-th carrier from a remaining BO of the first terminal based on channel information corresponding to the i-th carrier,
update the remaining BO based on the buffer usage for the i-th carrier, and
identify buffer usage for an (i+1)-th carrier from the updated remaining BO based on the channel information corresponding to the (i+1)-th carrier,
wherein the channel information comprises channel state information (CSI) including at least one of a channel quality indicator (CQI) or a rank indicator (RI).

14. The base station of claim 13, wherein the at least one processor is further configured to:
determine a modulation order, a first code rate, and the number of layers for the i-th carrier based on CSI of the i-th carrier, and
update an available resource amount for the i-th carrier based on the buffer usage for the i-th carrier, and
identify buffer usage for the i-th carrier based on the modulation order, the code rate, the number of the layers, and the available resource amount for the i-th carrier.

15. The base station of claim 14, wherein the buffer usage for the i-th carrier is determined based on the following equation, $$BO(i,n)=\min(MRP(i)\times RRB(i)\times T\times L, BO(n))$$

where n denotes a n-th terminal, BO (i,n) denotes the buffer usage for the i-th carrier, MRP(i) denotes channel capacity for the i-th carrier, RRB (i) denotes the number of resource blocks (RBs) corresponding to the available resource amount for the i-th carrier, T denotes the number of resource elements used to transmit data per RB, L denotes the number of the layers, and BO (n) denotes the remaining buffer amount of the n-th terminal.

16. The base station of claim 14, wherein the at least one processor is further configured to:
identify buffer usage of the second terminal for the i-th carrier based on CSI of the second terminal and the updated available resources amount for the i-th carrier,
allocate resources corresponding to the buffer usage of the first terminal to the i-th carrier, and
allocate resources corresponding to the buffer usage of the second terminal to the i-th carrier.

17. The base station of claim 10, wherein the first carrier is configured differently in each scheduling interval among a plurality of carriers.

18. The base station of claim 10,
wherein the at least one processor is further configured to transmit data to the first terminal via the resources allocated to the first carrier and the second carrier,
wherein, if the BO of the first terminal is changed, the second buffer usage is changed.

* * * * *